(12) United States Patent
Krener-Iversen et al.

(10) Patent No.: US 11,747,646 B2
(45) Date of Patent: Sep. 5, 2023

(54) DIRECTIONAL OLED DISPLAY

(71) Applicant: Realfiction Lab ApS, København K (DK)

(72) Inventors: Steen Svendstorp Krener-Iversen, København K (DK); Michael Rasmussen, København K (DK); Peter Allan Simonsen, København K (DK); Morten Corell, København K (DK)

(73) Assignee: Realfiction Lab ApS, København K (DK)

( * ) Notice: Subject to any disclaimer, the term of this patent is extended or adjusted under 35 U.S.C. 154(b) by 0 days.

(21) Appl. No.: 17/439,033

(22) PCT Filed: Mar. 16, 2020

(86) PCT No.: PCT/EP2020/057072
§ 371 (c)(1),
(2) Date: Sep. 14, 2021

(87) PCT Pub. No.: WO2020/187828
PCT Pub. Date: Sep. 24, 2020

(65) Prior Publication Data
US 2022/0155613 A1   May 19, 2022

(30) Foreign Application Priority Data

Mar. 15, 2019 (EP) ..................... 19163290
May 31, 2019 (EP) ..................... 19177726
Oct. 25, 2019 (EP) ..................... 19205469

(51) Int. Cl.
| | | |
|---|---|---|
| G02B 30/33 | (2020.01) | |
| G02B 3/00 | (2006.01) | |
| G06F 3/01 | (2006.01) | |
| G09G 3/3208 | (2016.01) | |

(52) U.S. Cl.
CPC .......... *G02B 30/33* (2020.01); *G02B 3/0056* (2013.01); *G06F 3/013* (2013.01); *G09G 3/3208* (2013.01); *G09G 2330/021* (2013.01)

(58) Field of Classification Search
CPC .. G02B 27/0093; G02B 3/0056; G02B 30/10; G02B 30/29; G02B 30/33; G06F 3/013; G09G 3/3208; G09G 2330/021; H04N 13/254; H04N 13/302; H04N 13/366
See application file for complete search history.

(56) References Cited

U.S. PATENT DOCUMENTS

| | | | |
|---|---|---|---|
| 2014/0145939 A1* | 5/2014 | Herold | G06F 3/005 345/156 |
| 2017/0176818 A1* | 6/2017 | Shi | G02F 1/137 |
| 2018/0366045 A1* | 12/2018 | Perreault | A61B 3/1015 |

* cited by examiner

*Primary Examiner* — Nelson M Rosario
(74) *Attorney, Agent, or Firm* — Joseph C. Zucchero; Carolyn S. Elmore; Elmore Patent Law Group, P.C.

(57) ABSTRACT

A time multiplexed, selectively updated, sub-pixel less, self-aligning, electrically and optically dual addressed, multi directional pixel is provided. This can potentially greatly increase the performance of an automultiscopic display and reduce the complexity. In one embodiment, an automultiscopic display can simply be provided by a plurality of directional OLED pixels.

13 Claims, 29 Drawing Sheets

DIRECTIONAL OLED DISPLAY

BACKGROUND

Figure 1A:
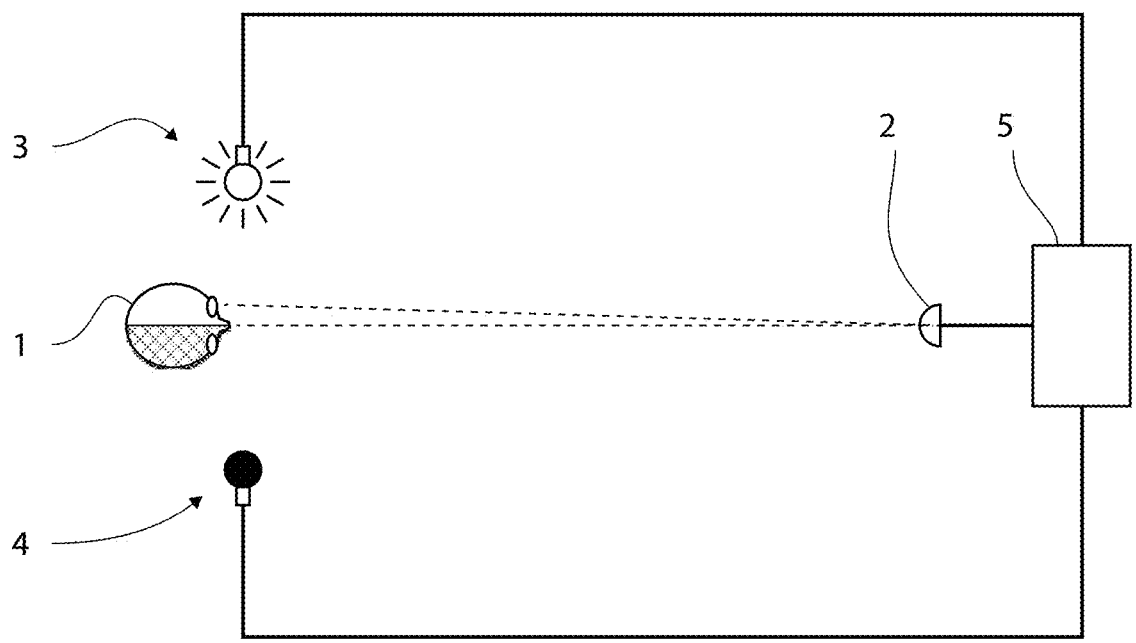

Light field displays can produce a synthetic light field which may deliver a stereoscopic reproduction of an object or a scene to one or more observers while simultaneously providing look-around capability, i.e. the experienced viewing angle and perspective changes in a way similar to that of a natural light field when an observer moves around the display, so it seems as if the scene or object was really there. A light field display is typically oriented horizontally so observes can walk around it an benefit fully from the look-around capability, although it can be positioned in many orientations.

Light field displays rely on the basic principle of directional pixels (sometimes referred to as hogels). A directional pixel is capable of emitting light rays of different intensity and color in different angles. It typically comprises a micro lens and an array of very small sub-pixels. The lens focuses light of individual sub-pixels in corresponding emission directions. A light field display is typically constructed as a very high resolution display with an overlaid micro lens array.

A light field display may be operated in a mode where a separate system tracks observer positions and render only the views that are emitted towards eyeballs of the observers, i.e. views that are not observed are not rendered or transmitted to the display. Such a configuration has been referred to as an automultiscopic display. This may simplify the image generating means which is providing still or moving images to the display, but it does not necessarily reduce the complexity of the display itself, since it still has to provide the capability of emitting light rays in any direction where an eyeball can potentially be positioned.

A high angular resolution, i.e. the number of discrete "views" (solid angle intervals of essentially homogenous irradiance from a pixel), is desirable because it may reduce the difference in perspective per view and hence distracting abrupt changes when a pupil of an observer moves from a view to a neighboring view. Further, it may reduce perceived blurring of objects when an observer's pupil is located at a boundary between views, so that light from both views enter the pupil. Further a high angular resolution increases the distance from which a stereoscopic effect can be observed and/or the field of view of the display.

A problem is that angular resolution comes at the cost of extreme complexity and the complexity scales with the square of the angular resolution. Consider a display that must be able to be observed from 5 meters distance and pixels should have a field of view of 90 degrees. Assuming the observer has a minimum eye distance of 55 mm, the angular resolution of the display must be $2 \times \tan^{-1}$ ((55 mm/2)/5000 mm degrees)=0.63 degrees to make sure each eye can see a different view. With perfect optics this will require a minimum of 143 views in a horizontal direction and 143 views in a vertical direction totaling a minimum theoretical number of $143^2$=20,449 views, corresponding to 20.449 sub-pixels per pixels. And this is for a monochrome display, a color display with a sub-pixel for each of the primary colors per pixel would require three times that number, i.e. 61.347 sub-pixels per pixel. For a full HD display this corresponds to 1920×1080×61.347=more than 127 billion sub-pixels. For comparison the highest resolution displays commercially available today, 8K displays, have about 100 million sub-pixels, more than thousand times less. Even if such a display could be constructed there is no technology available today to store, reproduce or render in real time moving images with 127 billion sub-pixels per frame.

This means that even the best light field displays and automultiscopic displays available today need to compromise significantly on resolution, viewing distance, field of view and color reproduction while still exhibiting distracting artifacts such as abrupt changes between discrete views when moving around while observing the display and/or blurred borders in observation positions on view boundaries. In spite of this, the natural depth perception and the look-around capabilities are for certain use cases so important factors, that there is in fact a market for light field and automultiscopic displays for certain applications, despite these quality restrictions. For a wider market acceptance, there is a need for a significant improvement in the performance parameters though.

SUMMARY OF THE INVENTION

It is an object of the invention to overcome the above described problems and provide an automultiscopic display pixel with better performance and lower manufacturing complexity and hence provide an automultiscopic display suitable for a wider market.

The pixel is selectively updated and time multiplexed. If for example eight eyeballs (four observes with two eyes each) are looking at the display, light may be emitted only towards each eyeball, i.e. in eight different directions, one eyeball at a time, at a high frame rate, for example 480 fps. Hence each observer may experience a stereoscopic image at 480/8=60 fps. Thus, in this example, the bandwidth of a display comprising the pixel may be only 8 times greater that of a corresponding normal display, not thousands of times greater. Further, instead of adding sub-pixel circuitry, the increased bandwidth is achieved by increasing the frame rate, which is much easier, especially on LED, OLED and some recent types of LCD displays. It is achieved, outside of the display itself, by tracking the face positions of the observers, and illuminating the observers with invisible infrared illumination in a sequence of 8 alternating patterns, so that a region of each pattern is illuminating an area comprising an eye region of an observer, and so that all 8 illumination patterns are projected at least one time in a full duty cycle of the system. The reflected infrared light from an eye region during a time slot is then detected by the pixel and controls the emitted visible light, so visible light from the pixel is only emitted back in the same direction as the infrared reflection, i.e. towards the eye region. (Alternative configurations will be disclosed in the detailed description). A novel way of controlling the direction of emitted visible light based on detected infrared reflections will be described in the following figures.

The above object and advantages together with numerous other objects and advantages, which will be evident from the description of the present invention, are ac-cording to a first aspect of the present invention obtained by:

A display for directional control of an image to an observer, said display comprising:

a plurality of image pixels arranged in a first segment covering an area of said display, each image pixel defining an area having a plurality of subpixels, each subpixel being optically addressable and comprising:

a thin film stack of an electroluminescent layer and a photo sensitive layer, said electroluminescent layer and said photo sensitive layer constituting an optical converter such that light incident on a respective subpixel leads to generation of a first cur-rent through said photo sensitive layer and through said electroluminescent layer such that said electroluminescent layer emits light from the position of said respective sub-pixel within said image pixel when a voltage being applied across said thin film stack, said display comprising:

an addressing light element having a plurality of addressing pixels for emitting light from a respective addressing pixel to said first segment and optically addressing the subpixels of said segment, each addressing pixel defining a direction from said first segment towards a viewpoint, an optical arrangement between said addressing light element and said optical converter, said optical arrangement having an optical power, a controller for addressing a respective addressing pixel for emitting light from said respective addressing pixel, said optical arrangement adapted for directing the light from said respective addressing pixel to the subpixels of said segment such that the subpixels of said first segment emits light visible from said viewpoint.

According to a second aspect of the present invention the above objects and advantages are obtained by:

A display for directional control of an image to an observer, said display comprising:

a plurality of image pixels, each image pixel defining an area having a plurality of subpixels, each subpixel being optically addressable and comprising:

a thin film stack of an electroluminescent layer and a photo sensitive layer, said electroluminescent layer and said photo sensitive layer constituting an optical converter, such that light incident on a respective subpixel leads to generation of a current through said photo sensitive layer and through said electroluminescent layer such that said electroluminescent layer emits light from the position of said respective subpixel within said image pixel, when a voltage is applied across said thin film stack, said display comprising:

an addressing light element having a plurality of addressing arrays, each addressing array having a plurality of addressing pixels for emitting light to said optical converter, said plurality of addressing arrays being arranged such that each image pixel being addressed by an addressing array, each addressing pixel in a respective addressing array for a respective image pixel defining a direction from said respective image pixel towards a viewpoint, a controller for addressing a respective addressing pixel for each addressing array such that the light from said respective addressing pixel being directed to a respective subpixel for each image pixel such that said image being visible from said viewpoint.

According to a third aspect of the present invention, the above objects and advantages are obtained by:

A system for directional control of an image in a display such as a television, said system comprising:

an image pixel defining an area constituting a plurality of subpixels, each subpixel being optically addressable, each subpixel comprising:

a thin film stack of an electroluminescent layer and a photo sensitive layer, said electroluminescent layer and said photo sensitive layer constituting an optical converter such that light incident on a respective subpixel leads to generation of a current through said photo sensitive layer and through said electroluminescent layer such that said electroluminescent layer emits light from the position of said respective subpixel within said image pixel when a voltage being applied across said thin film stack, said system comprising:

an addressing light element having a plurality of addressing pixels for emitting light from a respective addressing pixel to said optical converter, each addressing pixel defining a direction from said image pixel towards a viewpoint, an optical arrangement between said addressing light element and said optical converter, said optical arrangement having an optical power, a controller for addressing a respective addressing pixel for emitting light from said respective addressing pixel, said optical arrangement adapted for directing the light from said respective addressing pixel to a respective subpixel such that said image pixel emits light visible from said viewpoint.

According to a fourth aspect of the present invention, the above objects and advantages are obtained by:

A system for generating a 3D image for an observer, said system comprising:

a display for self-alignment of subpixels including a plurality of pixels arranged in a grid, each pixel defining an area for emitting light from a part of said area, and each pixel comprising:

a thin film stack of an electroluminescent layer and a photo sensitive/diode layer, said electroluminescent layer and said photo sensitive/diode layer constituting an optical converter, said system further comprising:

a plurality of light emitters or addressing pixels for illuminating said thin film stack, and an electric circuit for generating a current through said electroluminescent layer, the current density of said current through said electroluminescent layer having an amplitude varying with a maximum of 20% with respect to the average amplitude of the current density, the light from said plurality of light emitters or addressing pixels being modulated such that said thin film stack being illuminated in a first time interval in a first pattern defining the optical paths between said thin film stack and the left eye of said observer and said thin film stack being illuminated in a second time interval in a second pattern defining the optical paths between said thin film stack and the right eye of said observer such that in said first time interval, a first image for the left eye of said observer being emitted, and in said second time interval a second image for the right eye of said observer being emitted for generating said 3D image.

According to a fifth aspect of the present invention, the above objects and advantages are obtained by:

A system for generating a first image for a first observer and a second image for a second observer, said system comprising:

a display for self-alignment of subpixels including a plurality of pixels arranged in a grid, each pixel defining an area for emitting light from a part of said area, and each pixel comprising:

a thin film stack of an electroluminescent layer and a photo sensitive/diode layer, said electroluminescent layer and said photo sensitive/diode layer constituting an optical converter, said system further comprising:

a plurality of light emitters or addressing pixels for illuminating said thin film stack, the light from said plurality of light emitters or addressing pixels being modulated such that said thin film stack being illuminated in a first time interval in a first pattern defining the optical paths between said thin film stack and a first eye of said first observer and said thin film stack being illuminated in a second time interval in a second pattern defining the optical paths between said thin film stack and a second eye of said second observer, such that in said first time interval said first image for said first eye of said first observer being emitted, and in said second time interval said second image for said second eye of said second observer being emitted.

According to a sixth aspect of the present invention, the above objects and advantages are obtained by:

A system for reducing power consumption of a display, said system comprising:

a display for self-alignment of subpixels including a plurality of pixels arranged in a grid, each pixel defining an area for emitting light from a part of said area, and each pixel comprising:

a thin film stack of an electroluminescent layer and a photo sensitive/diode layer, said electroluminescent layer and said photo sensitive/diode layer constituting an optical converter, said system comprising:

a plurality of light emitters or addressing pixels for illuminating said thin film stack, the light from said plurality of light emitters or addressing pixels being modulated such that said thin film stack being illuminated with a first intensity in a first pattern defining the optical paths between said thin film stack and a first eye of an observer and such that said thin film stack being illuminated with a second intensity in areas outside of said first pattern, where said second intensity is lower than said first intensity.

According to a seventh aspect of the present invention the above objects and advantages are obtained by:

A monoscopic display for displaying a picture and for reducing power consumption while displaying said picture to an observer, said monoscopic display comprising:

a plurality of image pixels arranged in a grid, each image pixel defining an area for emitting light from a part of said area, and each image pixel comprising:

a thin film stack of an electroluminescent layer and a photo sensitive/diode layer, said electroluminescent layer and said photo sensitive/diode layer constituting an optical converter, said monoscopic display comprising:

a plurality of addressing pixels including a first addressing pixel and a second addressing pixel for illuminating said thin film stack, a controller for addressing said first addressing pixel and said second addressing pixel for emitting light from said first addressing pixel and said second addressing pixel, said first addressing pixel defining a first direction from a respective image pixel to-wards said observer, said second addressing pixel defining a second direction from a respective image pixel, said first direction being different than said second direction, the light from said first addressing pixel having a higher intensity than the light from said second addressing pixel.

DETAILED DESCRIPTION OF THE INVENTION

FIG. 1A shows a top view of an observer 1 observing an example of the disclosed pixel 2 in a first time slot of a duty cycle. A first infrared illumination source 3 may be located to the left of the observer and may be capable of illuminating a left part of his face including his left eye with essentially invisible infrared light in a first region of the electromagnetic spectrum.

A second infrared illumination source 4 may be located to the right of his face and may be capable of illuminating a right part of his face including his right eye with essentially invisible infrared light in the first region of the electromagnetic spectrum.

The first infrared region of the electromagnetic spectrum may be centered around a wavelength of 900 nm.

A controller 5 may be capable of controlling the light emission from the first infrared illumination source 3 and of controlling the light emission from the second infrared illumination source 4.

In the first time slot, the controller 5 may direct the first infrared illumination source 3 to emit light and the second infrared illumination source 4 to be dark. Hence, a left side of the observer's face comprising his left eye may be illuminated with infrared light in the first region of the electromagnetic spectrum and a right side of the observer's face comprising his right eye may be essentially dark in the first infrared region of the electromagnetic spectrum.

The pixel 2 may be capable of sensing infrared light in the first region of the electromagnetic spectrum and of emitting essentially no visible light in directions from which incident infrared light in the first region of the electromagnetic spectrum has an intensity below a first threshold T1 and of emitting visible light with a set of light characteristics in directions from which incident infrared light in the first region of the electromagnetic spectrum has an intensity above a second threshold T2. The set of light characteristics may be essentially independent of the intensity of incident infrared light in the first region of the electromagnetic spectrum when said intensity is above the second threshold T2. The set of light characteristics may include a light intensity. The pixel 2, the first infrared illumination source 3 and other light sources (not shown) illuminating the observer may be configured so that received infrared light in the first region of the electromagnetic spectrum reflected from the right side of the face of the observer 1 is below the threshold T1 and so that received infrared light in the first region of the electromagnetic spectrum reflected from the left side of the face of the observer 1 is above the threshold T2. Hence, the pixel 2 may emit visible light towards a left side of the face of the observer 1 and it may essentially emit no visible light towards a right side of the face of the observer 1, hence the observer 1 may see the pixel 2 as emitting light with his left eye and as essentially dark with his right eye. The pixel 2 may be capable of altering the set of light characteristics as a function of a received signal transmitted from a controller 5. In the first time slot, the controller 5 may transmit a signal causing the pixel to set the set of light characteristics to a set of light characteristics intended to be observed by the left eye of the observer 1. Hence, in the first time slot the observer 1 may with his left eye see the pixel 2 emitting light with a set of characteristics intended for his left eye and may with his right eye see the pixel as dark.

Figure 1B:
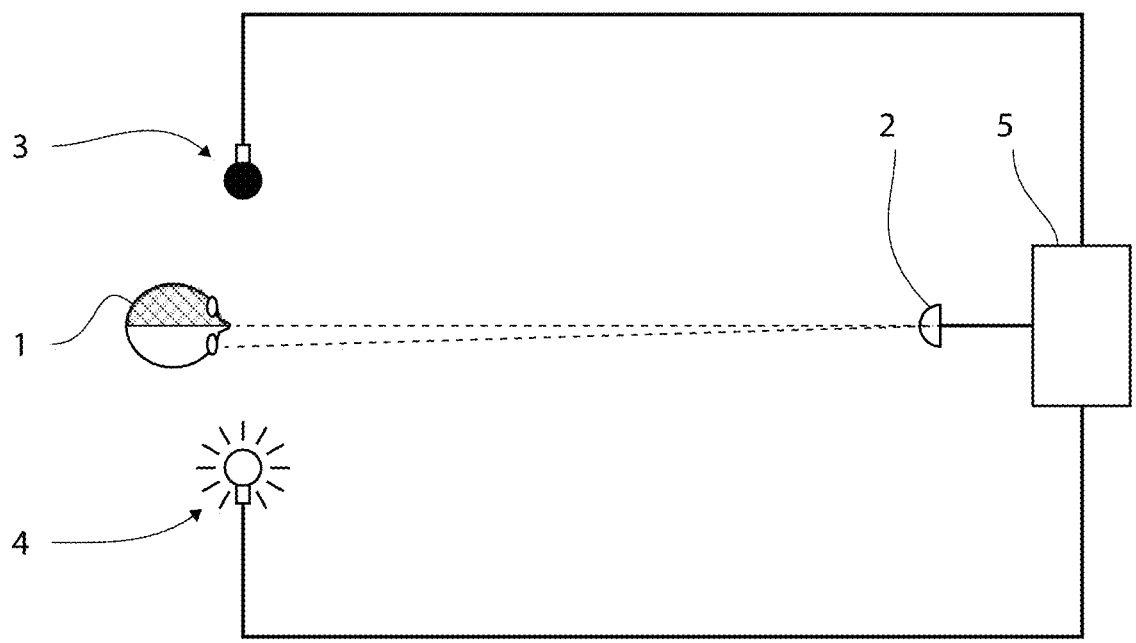

FIG. 1B shows a top view of the same configuration as in FIG. 1A in a second time slot of a duty cycle. In the second time slot, the first infrared illumination source 3 may be dark and the second infrared illumination source 4 may be emitting light in the first region of the electromagnetic spectrum and the controller 5 may transmit a signal causing the pixel to set the set of light characteristics to a set of light characteristics intended to be observed by the right eye of the observer 1. In a similar manner to the operation described in the description above for FIG. 2A, the observer 1 may in the second time slot with his right eye see the pixel 2 emitting light with a set of characteristics intended for his right eye and may with his left eye see the pixel as dark.

The controller 5 may during the duty cycle alternate between the state described for the first time slot of and the state described for the second time slot. Hence, during a duty cycle, the observer 1 will in the first time slot see with his left eye the pixel 2 as intended for his left eye and with his right eye see the pixel 2 as dark and in the second time slot, he will see with his right eye the pixel 2 as intended for his right eye and with his left eye see the pixel 2 as dark. The controller 5 may perform a number N of duty cycles per second. N may be selected to a number high enough that the observer 1 is not able to perceive the changes between the first time slot and the second time slot but observes time integrated light characteristics due to retinal time integration. N may for example be selected to 60 duty cycles per second or higher. Hence, the observer 1 may see with his left eye a time integrated value of essentially 50% of the intended light and 50% dark. The controller 5 may increase the intensity of emitted light in the first time slot to compensate for this. Hence, the observer 1 may see with his left eye light with a set of characteristics intended for his left eye. Similarly, the controller 5 may increase the intensity of emitted light in the second time slot. Hence, the observer 1 may see with his right eye light with a set of characteristics intended for his right eye.

The pixel 2 may be comprised in a display with a multitude of pixels.

The first infrared illumination source 3 and the second infrared illumination source 4 may be elongated or may comprise a number of emitters and may for example be located at the walls of a room so the observer 1 is illuminated essentially as described above even when moving between different positions. Hence, the observer 1 may have a relatively large degree of freedom to move around. Alternatively, the first infrared illumination source 3 and/or the second infrared illumination source 4 may comprise a realtime dynamic projection mapping system such as the one described in Korean patent KR101465497B1, which is hereby incorporated in its entirety into the description by reference. Another example of a high speed projection mapping is the Fujitsu Dynaflash projector with software developed by Ishikawa Watanabe Lab and Tokyo Electron Device Limited used for super high speed face mapping in the Inori art project.

The light source in a projector in the dynamic realtime projection mapping system may be replaced with an infrared light source. More than one observer may be observing the pixel. Observers may be illuminated in a duty cycle for example in a sequence essentially like this: Left side of the face of a first observer, left side of the face of a second observer, left side of a face of a third observer, right side of the face of the first observer, right side of the face of the second observer and right side of the face of the third observer. Synchronized with the illuminations of the face sides light of characteristics for the corresponding eyes may be emitted in a similar manner to the above described time slots. The number N of duty cycles per second may also in this configuration be 60 duty cycles per second, hence each eye may be illuminated 60 times per second and hence the time slots may be shorter. Positions of the eyes of the observes may be tracked for example by a tracking system comprised in a projection mapping system or alternatively by a separate eye tracking or observer tracking system and tracked eye positions may be used to calculate sets of light characteristics for the pixel 2 corresponding to perspective views of the eyes of the observers, as is known from existing eye tracking autostereoscopic and automultiscopic display systems. Alternatively, a set of light characteristics corresponding to a left eye perspective view of a scene may be emitted to left eyes of observers and a set of light characteristics corresponding to a right eye perspective view of a scene may be emitted to right eyes of observers, as is known from existing autostereoscopic displays.

Figure 2A:
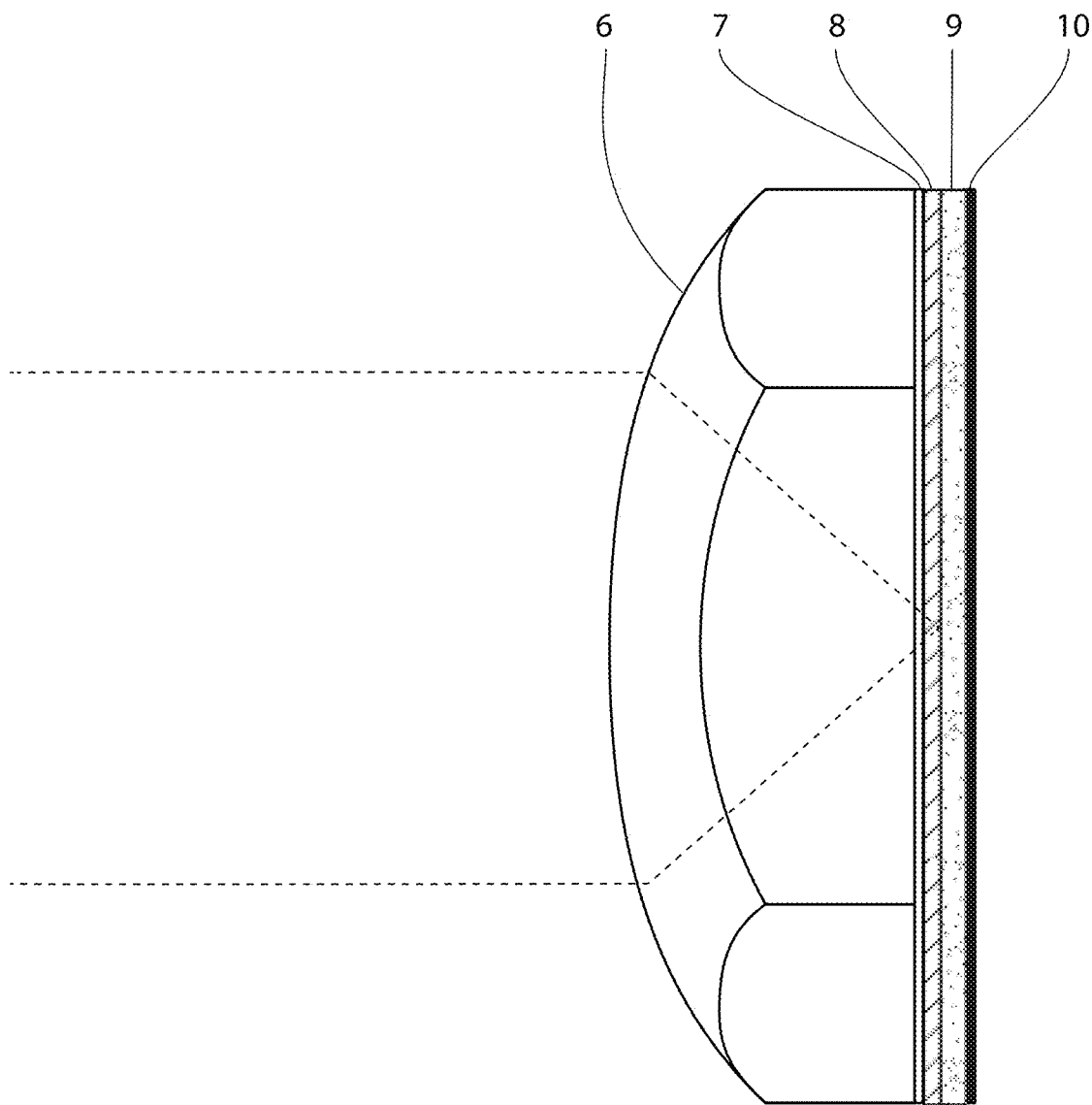

FIG. 2A shows a side view of the pixel 2 in more detail, illustrating the capability of emitting no visible light in a direction from which infrared light in the first region of the electromagnetic spectrum of intensity below the first threshold T1 is received and emitting visible light with a set of light characteristics in a direction from which infrared light in the first region of the electromagnetic spectrum of intensity above the second threshold T2 is received.

A microlens 6 is provided, which may for example be a hexagonal planar-convex lens of polyethylene naphtalate, amorphous polyester or polypropylene. The microlens 6 may have a diameter of for example approximately 200 micrometers and a focal plane essentially coinciding with the planar surface.

It may for example be a lens comprised in a lens array, for example in a commercially available MicroLux™ fly's eye lens array sheet manufactured by Forward Optics, Wisconsin, USA.

At the planar side of the microlens 6 may be deposited a thin film transparent electrode layer 7, which may be an indium tin oxide (ITO) layer. On the ITO layer, a photodiode layer 8 may be deposited, which may comprise a number of organic thin film layers constituting an organic photodiode (OPD). On the photodiode layer 8, an electroluminescent layer 9 may be deposited, which may comprise a number of organic thin film layers constituting an organic light emitting diode (OLED). On the electroluminescent layer, an electrode layer 10 may be deposited, which may be a thin film aluminum layer.

It is noted that the drawing is not to scale and the thicknesses of the thin film layers are great exaggerated in order to be visible on the drawing.

The layers 7, 8, 9 and 10 may together constitute an organic upconversion device capable of sensing infrared light and where it is illuminated by infrared light it may emit visible light. (The detailed operation of the upconversion device shall be described in a section further below).

The observer 1 (not shown) may be located for example 50 cm away from the pixel, which may correspond to more than a thousand times the focal length of the lens, hence an image of the observer 1 projected through the lens onto the layers may essentially be in focus throughout the layers. The observer 1 may have the left side of his face illuminated with infrared light in the first region of the electromagnetic spectrum and the right side of this face may be infrared dark, i.e. essentially not illuminated with infrared light in the first region of the electromagnetic spectrum. An image of his face may be projected onto the upconversion device by the microlens 6. The right side of the projected image of his face may in all areas have an intensity of infrared light in a first region of the electromagnetic spectrum below a third threshold T1', which may correspond to the intensity of infrared light of an intensity below the first threshold T1 received at the pixel and projected onto the upconversion device. The left side of the projected image of his face may in all areas have an intensity above a fourth threshold T2', which may correspond to the intensity of infrared light of an intensity above the second threshold T2 received at the pixel and projected onto the upconversion device.

Thus, the projected infrared image of the left side of the his face may cause the upconversion device to emit visible light with a set of light characteristics in an area corresponding to the projected infrared image of the left side of his face. A visible image of said area will be projected through lens back towards the observer 1 essentially along the same path as the infrared light but in the opposite direction and the visible light may cover the left side of the observer's face. Hence, the observer may, with his left eye, see the pixel 2 emitting light whereas with his right eye he may see the pixel 2 as dark. Likewise if the right side of his face is illuminated with infrared light and the left side is infrared dark he may see, with his right eye, the pixel 2 emitting light and with his left eye he may see the pixel 2 as dark. The pixel 2 can also be described as an upconverting retroreflector with a thresholding function.

Figure 2B:
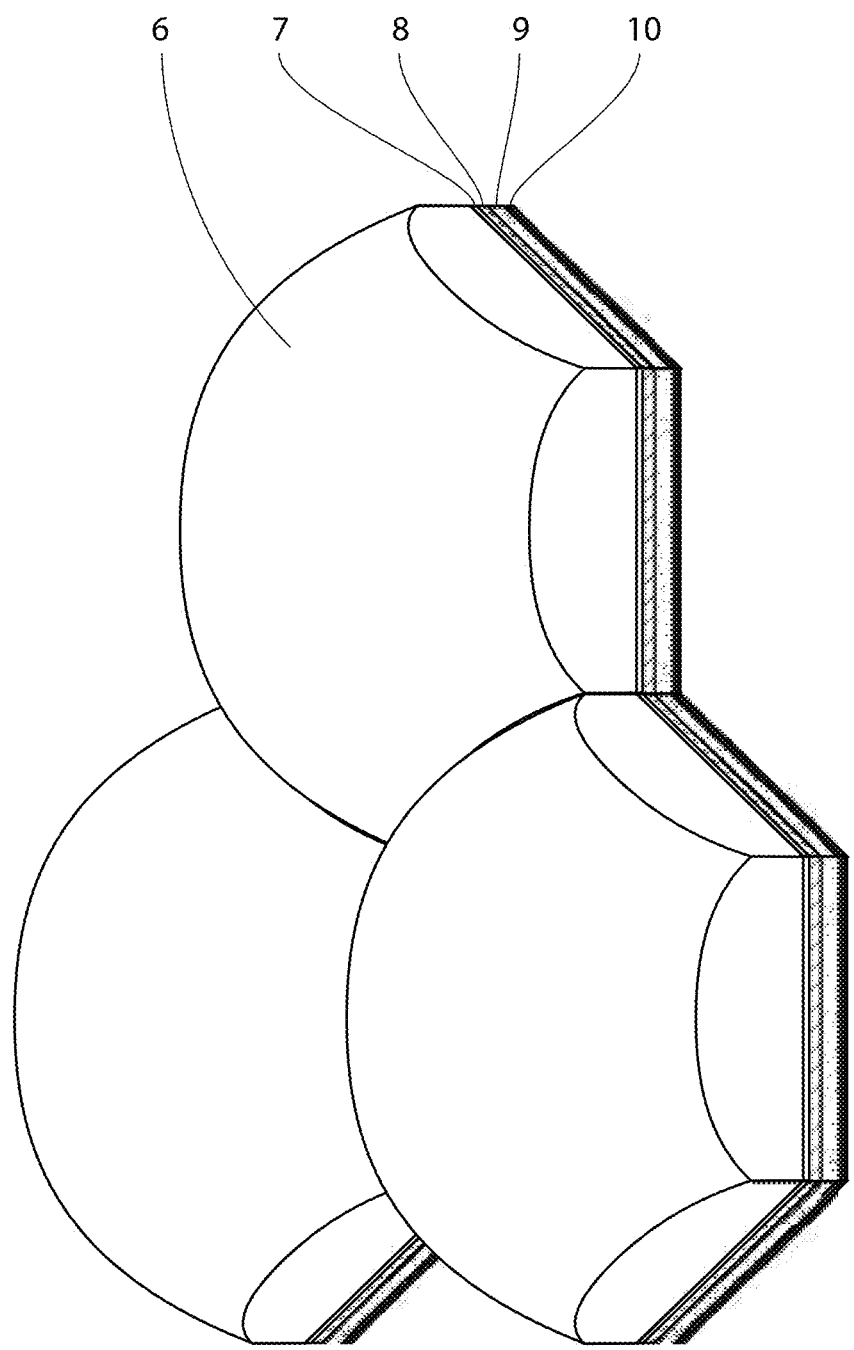

FIG. 2B shows a perspective view of an example of a number of pixels essentially similar to the pixel 2, as they may be located in a display. A hexagonal shape of the microlens 6 may allow for a very high fill factor when the microlens 6 is located in a microlens array, i.e. the microlenses may be tightly packed so the space between microlenses may be very small. This has the advantage of very little light leakage, i.e. very little visible light can escape outside of the lenses and a high percentage of the emitted visible light is therefore projected onto a side of the observer's face. A low light leakage has for example the advantage of low crosstalk between left eye and right eye perspective views of a stereoscopic image displayed on a display comprising the pixel 2. Additional transparent electrodes (not shown) may be comprised and connected to pixels for example in a similar manner to electrodes in a traditional passive matrix—or active matrix OLED or LCD display. Pixel driver circuits may be comprised for example in a similar manner to pixel driver circuits in a traditional active matrix OLED or LCD display, for example in the form of transparent thin film electronic circuits or in the form of thin film electronics on a backplane which may comprise for example lot temperature polysilicon or amorphous silicon or crystalline silicon.

Figure 3:
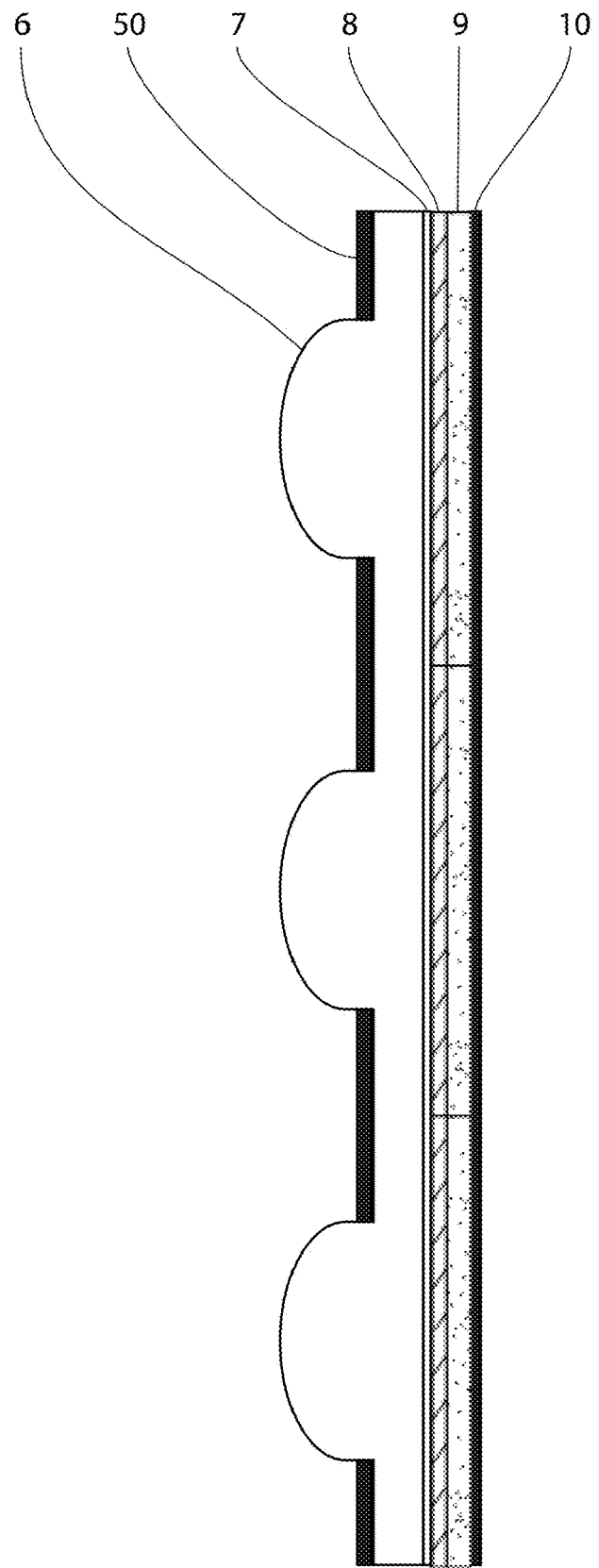

FIG. 3 shows a close up of a section view of an example of an alternative configuration where the microlenses are spaced apart. The microlens 6 may be shaped so it has a surface to the sides of the lens curvature and the microlenses may be part of a common structure where the surface may be between the microlenses on the side facing the observer 1. The surface may be flat or rough or structures. On the surface, an opaque layer 50, which may comprise for example ink, dye or paint, may be deposited. An advantage of this configuration may be that lenses can emit light in a wider range of angles without resulting in crosstalk between pixels, by avoiding that an area on the electroluminescent layer 9 in the pixel emitting light is projected in an undesired emission angle by the neighboring pixel and further by avoiding that a lens of a neighboring pixel is obstructing the field of view of the pixel 2.

Figure 4:
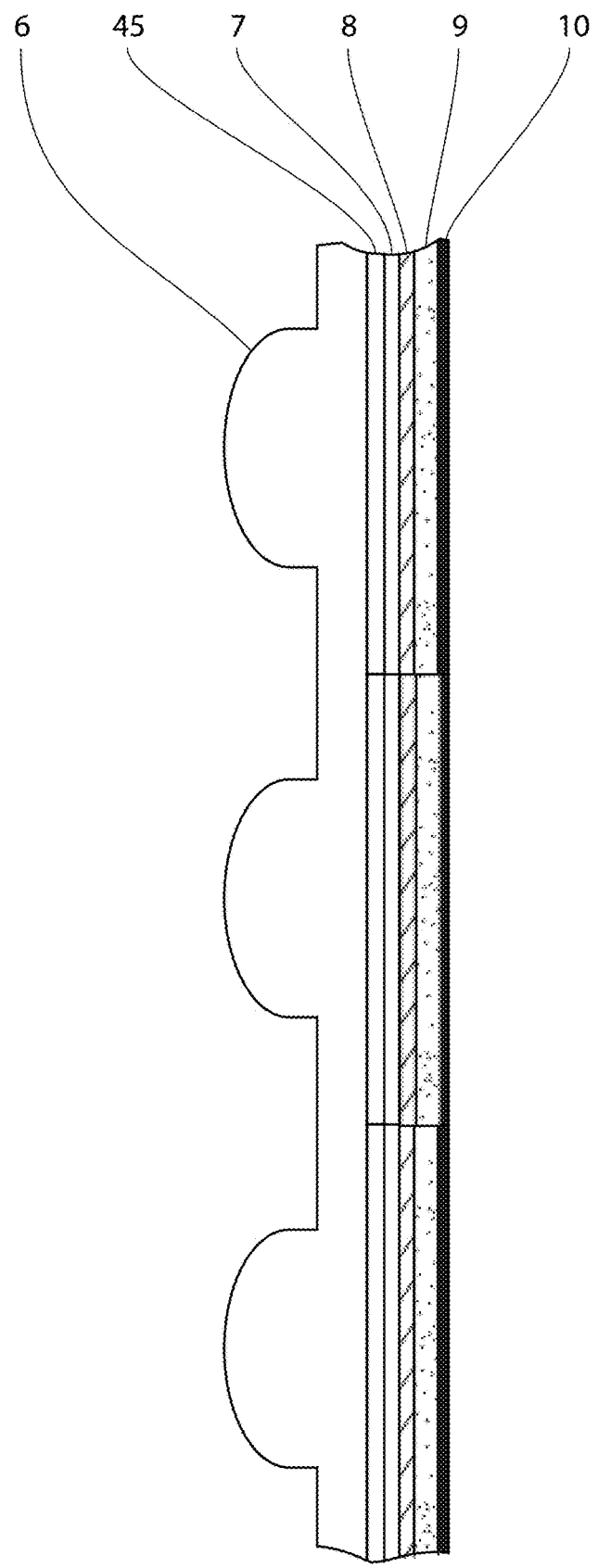

FIG. 4 shows a close up of a section view of an example of an alternative configuration similar to the configuration shown in FIG. 3 where a color filter mask 45 may be comprised. The color filter mask may comprise color filters, which may be for example red, green and blue color filters and may enable displaying a color image in a similar manner to for example a traditional white OLED color filter (WOLED-CF) display. The electroluminescent layer 9 may be configured to emit white light, for example configured similarly to an electroluminescent layer in a WOLED display. The color filters may comprise ink or dye and may be transparent to infrared light in the first region of the electromagnetic spectrum. The color filters may be located between the microlens 6 and the transparent electrode layer 7. It may for example be deposited on the microlens 6, for example deposited on a substrate or sheet of a number of microlenses for example by ink jet printing or by a lithographics process. Additionally an overcoat (not shown) may be deposited between a color filter and the transparent electrode layer 7. The overcoat may be of a type essentially similar to an overcoat used in a traditional LCD display between a color mask and a transparent electrode layer.

Figure 5:
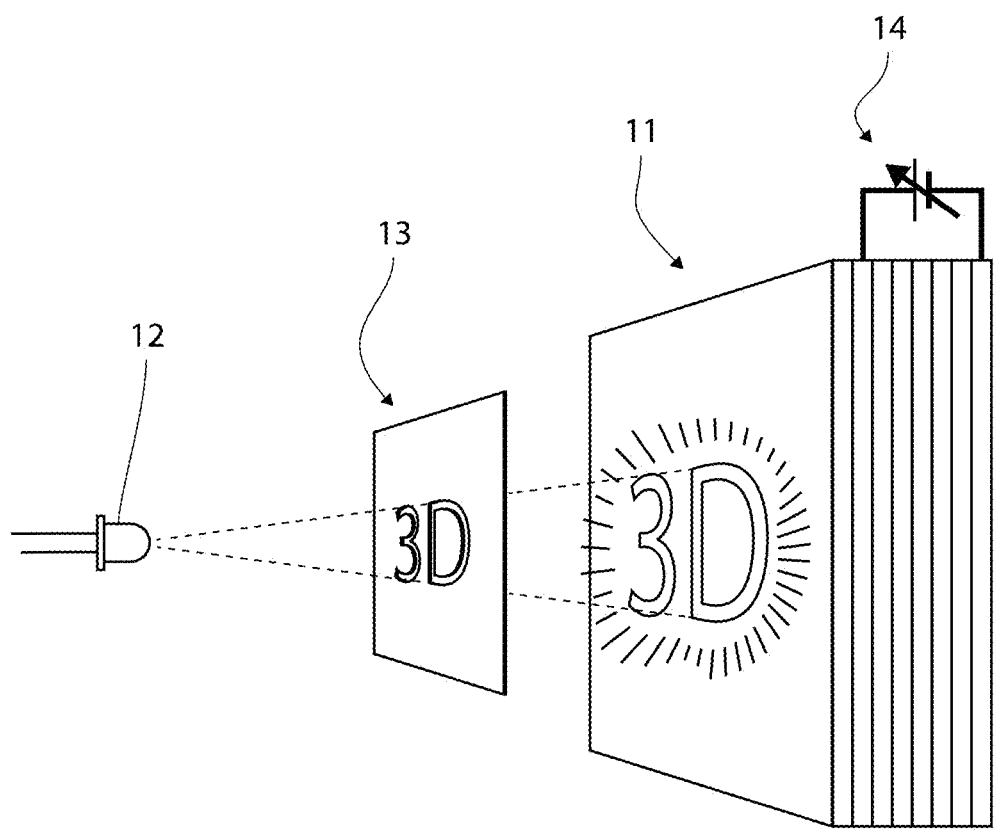

FIG. 5 shows a perspective view of a configuration for demonstrating and testing an upconversion device 11 capable of emitting essentially no visible light in areas with incident infrared illumination with intensity below the third threshold T1' and of emitting emitting visible light with intensity essentially independent of the intensity of incident infrared illumination when the incident infrared illumination has an intensity above the fourth threshold T2'. This configuration is not representing the disclosed invention but is included as background information for conveying an understanding of the underlying principle. The upconversion device is powered by a voltage source 14. An infrared LED 12 illuminates the upconversion device 11 through a mask 13 with a punched out pattern and the upconversion device 11 glows up with visible light in the same pattern as in the mask 13. A similar configuration and construction of an organic upconversion device is described in the paper "Organic Upconversion Display with an over 100% Photo-to-photon Upconversion Efficiency and a Simple Pixelless Device Structure" by Song et al. published in J. Phys. Chem. Lett. 2018, 9, pp 6818-6824, which is hereby in it's entirety incorporated in this description by reference. When the infrared illumination has an intensity below the third threshold T1' the forward bias voltage over a set of organic layers constituting the electroluminescent layer 9 may be too small to cause essentially any visible light emission. When the infrared illumination has an intensity above the fourth threshold T2' the intensity of emitted light may be limited by phenomenae not related to the infrared illumination intensity such as limitations in hole—and electron injection layers and saturation of the photodiode layer 8 and hence the intensity of emitted light may be essentially independent on the intensity of incident infrared light when the intensity of emitted light is above the fourth threshold T2'.

Figure 6:
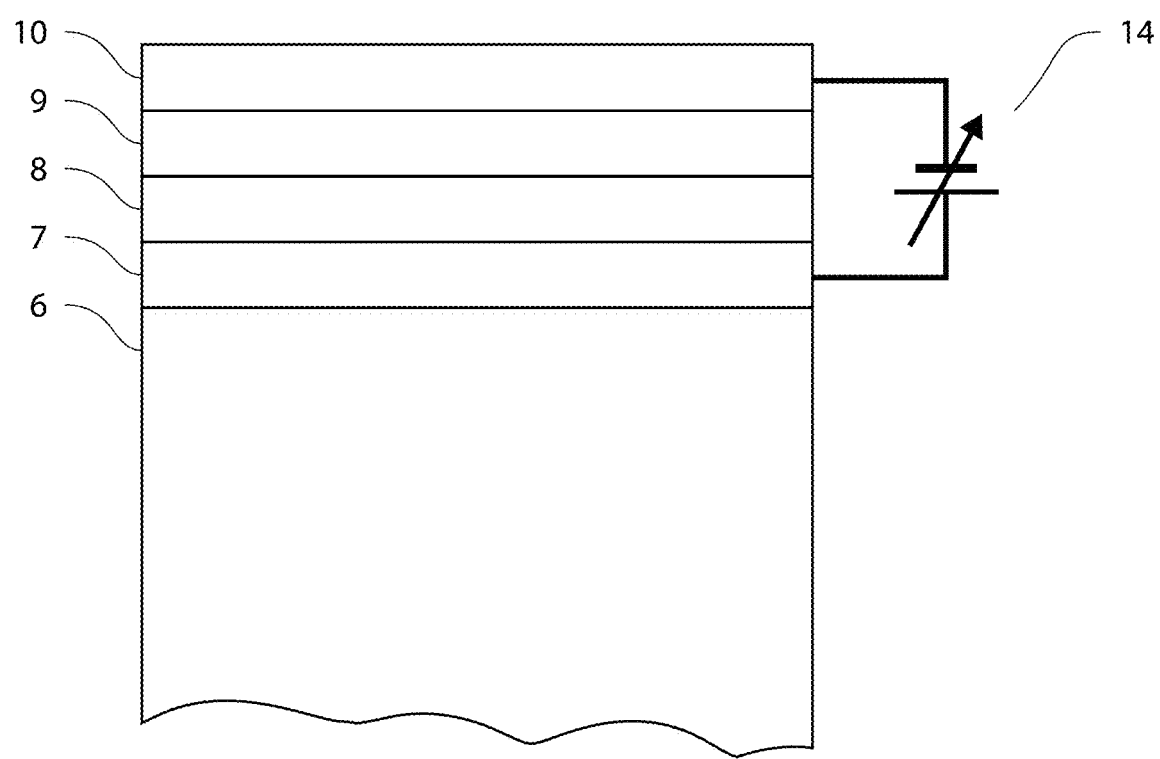

FIG. 6 shows a close up of a section view of an example of thin film layers in the pixel 2. (Note that the name labels indicated in the layers are examples for reference intended to make the drawings easier to understand at a glance. They should not be interpreted to limit the choice of materials or impose any other limitations in any way to the description. This applies to all drawings in this description). Note that the layer 8 may comprise several layers itself and the layer 9 may likewise comprise several layers itself. This will be described in more detailed further below.

A voltage source 14 is provided with its positive terminal connected to the transparent electrode layer 7 and the negative terminal connected to the electrode layer 10. The advantage of a voltage source over a current source which is traditionally used in OLED devices without a photodiode layer is that with a voltage source the current density in one area of the thin film layers is essentially not dependent on the current densities in other areas of the layers, hence visible emission in one area is essentially only dependent on incident infrared illumination of that same area. The thin film layers may be configured so that when the intensity of incident infrared illumination is greater than the threshold T2' then the intensity of emitted visible light is little or essentially not dependent on the intensity of incident infrared illumination and hence little or essentially not dependent on factors like changes in reflectivity of the face of the observer 1, changes in infrared illumination from sources unrelated to the pixel 2 and other factors that it may be difficult to control. (Configuration of the thin film layers is discussed in more detail below). The intensity of emitted visible light in areas of incident infrared illumination with an intensity greater than the threshold T2 may be controlled by the controller 5 for example by controlling a voltage level supplied across the electrode layers or by pulse width modulation of a voltage supplied across the electrode layers or by a combination hereof.

However, due to the use of a voltage source, the intensity of emitted visible light may further be dependent on temperature changes in the thin film layers which may cause changes in the voltage drop over the layers and the intensity may further be dependent on changes in the currents in the electrical paths from voltage source to electrode layers which may cause changes in the voltage drop over the electrodes. This may cause undesired intensity changes in light emitted from the pixel 2. To mitigate these effects, a temperature control system (not shown) may be included which may be capable of keeping the thin film layers within a temperature range, for example between 20 and 22 degrees. The temperature control system may for example comprise a ventilation system or a peltier element. Further, the electrical paths from the voltage source to the electrode layers may be made thick to increase conductance and hence reduce voltage drop. However, practical applications may include a display with a multitude of pixels similar to the pixel 2 and it may be costly, impractical and/or power consuming to control the temperature of all pixels within narrow bounds. Further, the electrical paths from the voltage source to the transparent electrode layers of pixels not at the edge of the display may themselves need to be transparent electrodes on the display substrate and thick electrodes are generally less transparent and hence introduce a loss of efficiency.

Figure 7:
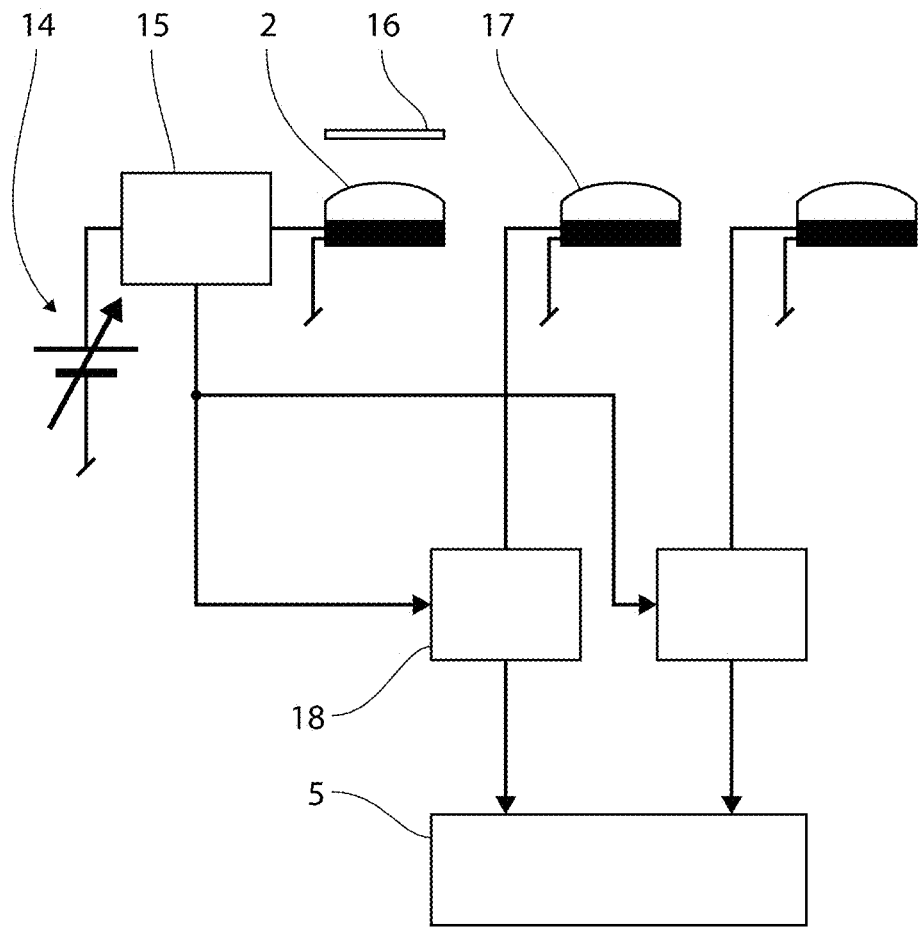

FIG. 7 shows a schematic representation of an example of a configuration, which may reduce undesired intensity changes without significant cost increase, power consumption or efficiency reduction.

The pixel 2 may be located in a display (not shown) near or at the edge and the electrode layers of the pixel 2 may be connected to the voltage source 14 with a set of low resistance conductors (not shown). They can have a low resistance because a large fraction of them do not need to be transparent since the pixel 2 is at the edge.

The low resistance conductors may for example have a combined series resistance of 1 ohm. A temperature control system (not shown), which may for example comprise a peltier element, keeps the temperature of the thin film layers in the pixel 2 within a narrow range, for example between 19.5 and 20.5 degrees.

The controller 5 may direct the voltage source to output a voltage to the pixel 2 corresponding to a desired maximum brightness. The voltage may be selected by an operator looking at the pixel 2 and the operator may use a user interface on the controller to direct the controller to adjust the voltage until the pixel 2 has a brightness that the operator desires.

Alternatively, the voltage may be decided at design time of a display type or at manufacturing time of a display.

An optical low-pass filter 16 may be located in front of the pixel 2 at the side facing the observer 1. The optical low-pass filter 16 may transmit infrared light and block visible light by absorption and/or reflection, hence it may allow the pixel 2 to sense infrared light without emitting distracting visible light towards the observer 1.

The optical low-pass filter 16 may be located so the operator is able to see visible light from the pixel 2 without the optical low-pass filter 16 obstructing the light. The optical low-pass filter 16 may for example be a simple infrared transmitting polymer dye filter and it may be integrated in a display frame or the display frame itself may be an infrared transmitting, visible blocking dyed polymer. Comprised in the display is further a second pixel 17, which is configured essentially identical to the pixel 2, except that the second pixel 17 may have no temperature control and it may be connected to a current source 18 instead of a voltage source and it may be connected with a set of higher resistance conductors, which may have higher resistance than the set of low resistance conductors. For example, the higher resistance conductors may have a combined series resistance of 10 ohm. The pixel 2 and the second pixel 16 may be located so they essentially receive the same infrared light, they may for example both be located at the surface of the display. A load monitor 15 capable of measuring the current through the pixel 2 and of sending a reference signal to a maximum signal input of a current source 18 may further be comprised. The current source 18 may be a current controlled current source capable of taking a maximum signal and a value signal as inputs, where the maximum signal directs a maximum current and the value signal directs a target current, expressed as a fraction of the maximum current. The current source 18 may be capable of essentially maintaining the target current on its output. Hence, the current through the second pixel 17 is constantly calibrated by the current through the pixel 2 at a level so the current density in infrared illuminated areas are essentially independent of the voltage drop over the thin film layers in the second pixel 17 and of the voltage drop over the electrical paths to its electrodes, because the pixel 2 receives the same amount of incident infrared light but changes in its voltage drops are reduced or eliminated. Hence, the intensity of emitted visible light from the second pixel 17 and from other pixels in the display configured similarly become essentially independent of temperature and current variations and undesired intensity changes are reduced or eliminated. The current source 18 may for example be comprised in a multiplexing LED display-controller (not shown). The controller 5 may modulate the intensity of emitted visible light by modulating the signal sent to the value input of the current source. Alternatively, it may modulate the intensity by pulse width modulation. Alternatively, it may use a combination of modulating the signal sent to the value input of the current source and pulse width modulation. A pulse width modulation may be performed in a multiplexing display-controller and may be directed by the controller 5. The pulse width modulation may be combined with a passive matrix multiplexing. The multiplexing LED display controller may for example be the integrated circuit TLC5958 manufactured by Texas Instruments, Texas, USA or a passive matrix LED display controller from Macroblox, Schenzen, China or similar.

Figure 8:
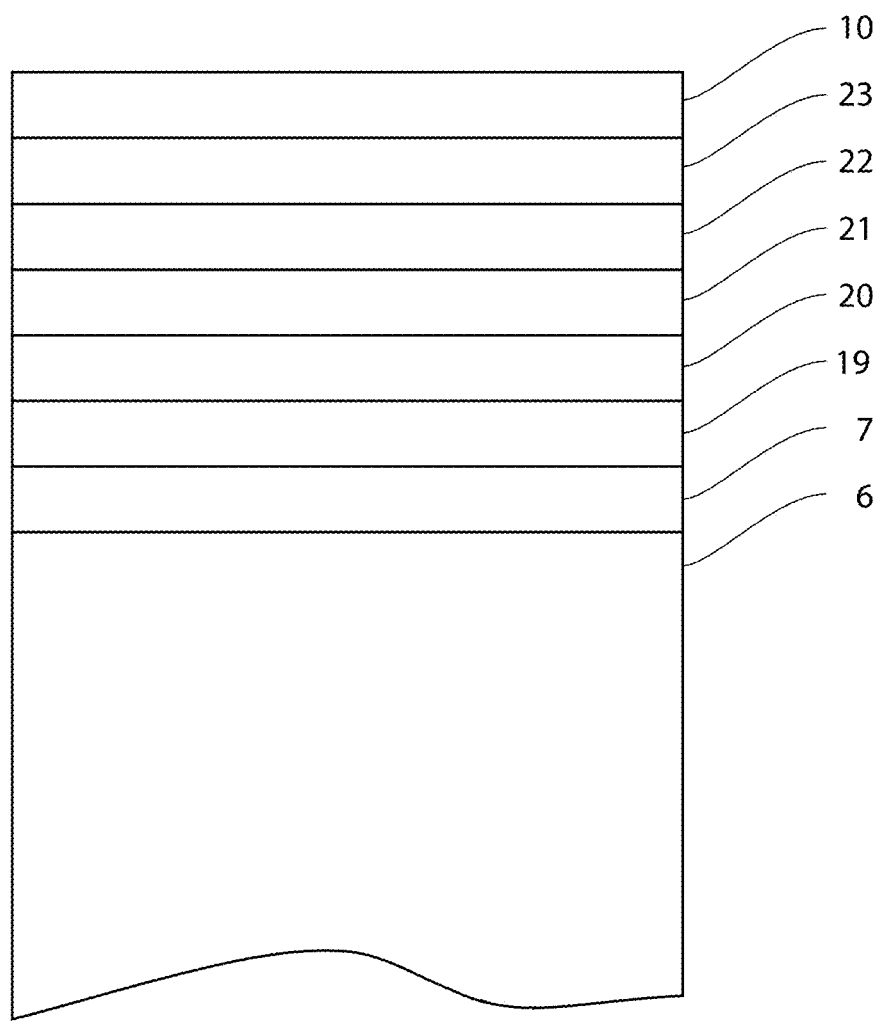

FIG. 8 shows a close up of a section view of an example of thin film layers comprised in the pixel 2. On top of the transparent electrode layer 7, at the side facing away from the microlens 6, may be deposited a first organic photodiode layer 19 and on top of that may be deposited a second organic photodiode layer 20.

The first organic photodiode layer 19 and the second organic photodiode layer 20 may together constitute the photodiode layer 8 which may have a high internal quantum efficiency and which may be sensitive to infrared light having a peak wavelength at for example approximately 900 nm. The first organic photodiode layer 19 may be a 65 nm thick $C_{60}$ layer and the second organic photodiode layer 20 may be a 60 nm thick PbPc layer.

On top of the second organic photodiode layer 20 may be deposited a first OLED layer 21. On top of the first OLED layer 21 may be deposited a second OLED layer 22. On top of the second OLED layer 22 may be deposited a third OLED layer 23. The first OLED layer 21, the second OLED layer 22 and the third OLED layer 23 may together constitute the electroluminescent layer 9, which may be capable of emitting visible light for example having a peak wavelength at 900 nm.

Together the photodetector layer 9 and the electroluminescent layer 9 may constitute and organic upconversion device which may have a high photon-to-photon upconversion efficiency. An example of such an upconversion device has been publicized in the paper "Organic Upconversion Display with an over 100% Photo-to-photon Upconversion Efficiency and a Simple Pixelless Device Structure" by Song et al. published in J. Phys. Chem. Lett. 2018, 9, 6818-6824, which has already been incorporated in the description by reference.

Figure 9:
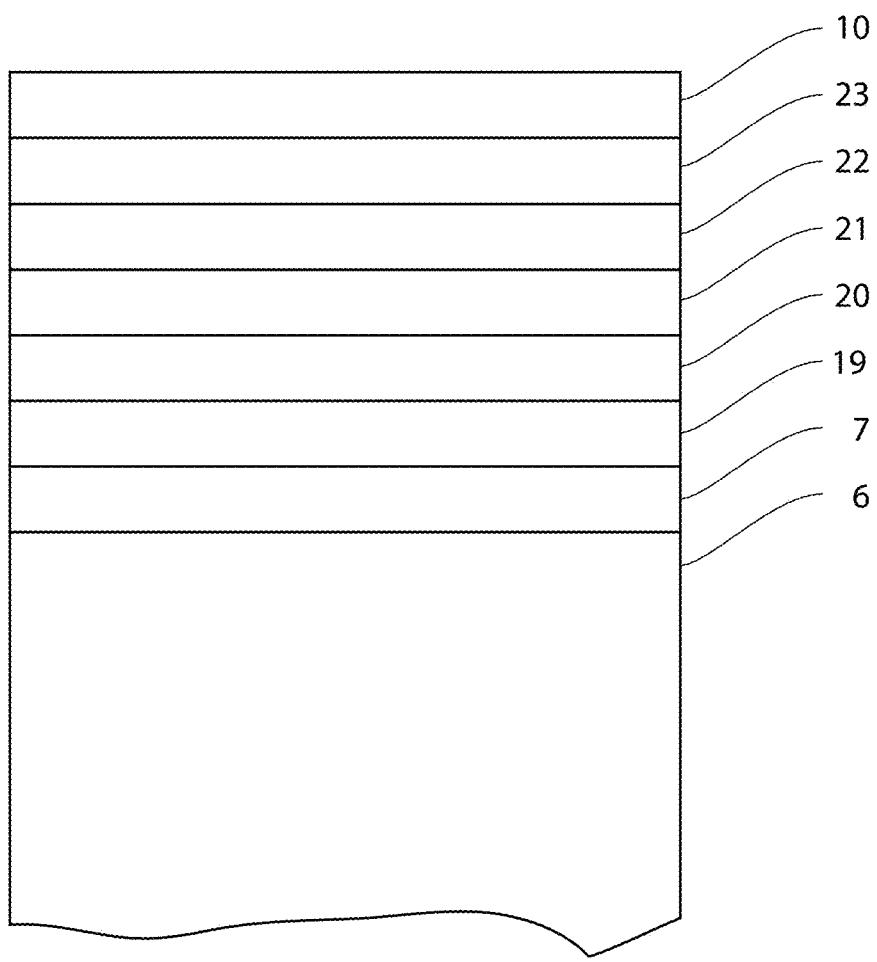

FIG. 9 shows a close up of a section view of another example of thin film layers comprised in the pixel 2. In this configuration, the second organic photodiode layer 20 may be a layer of ZnPc, the first OLED layer 21 may be a layer of 4P-NPD, the second OLED layer 22 may be a layer of Alq3 and the third OLED layer 23 may be a layer of BCP.

Figure 10:
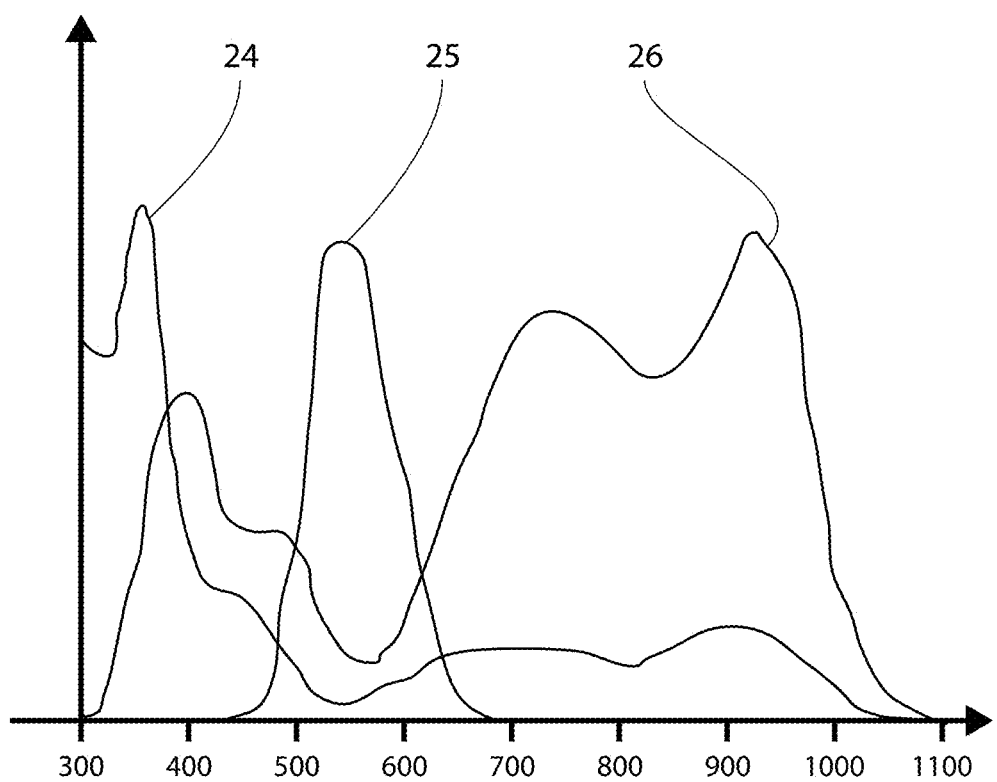

FIG. 10 is a diagram showing characteristics corresponding to the layer configuration in FIG. 8 comprising a first graph 24 showing an approximated example of an absorption spectrum of the photodiode layer 8, a second graph 25 showing an approximated example of an emission spectrum of the electroluminescent layer 9 and a third graph 26 showing an approximated example of an external quantum efficiency of the photodiode layer 8. The graphs are shown as relative values for comparison between them since they are properties not all sharing the same units. It can be seen that a section area between the first graph 24 and the second graph 25 is relatively small, hence the self-absorption may be minimized in this configuration which may increase the device efficiency. It can further be seen that a section area between the second graph 25 and the third graph 26 is also relatively small, hence the self-excitation may also be relatively small.

Figure 11:
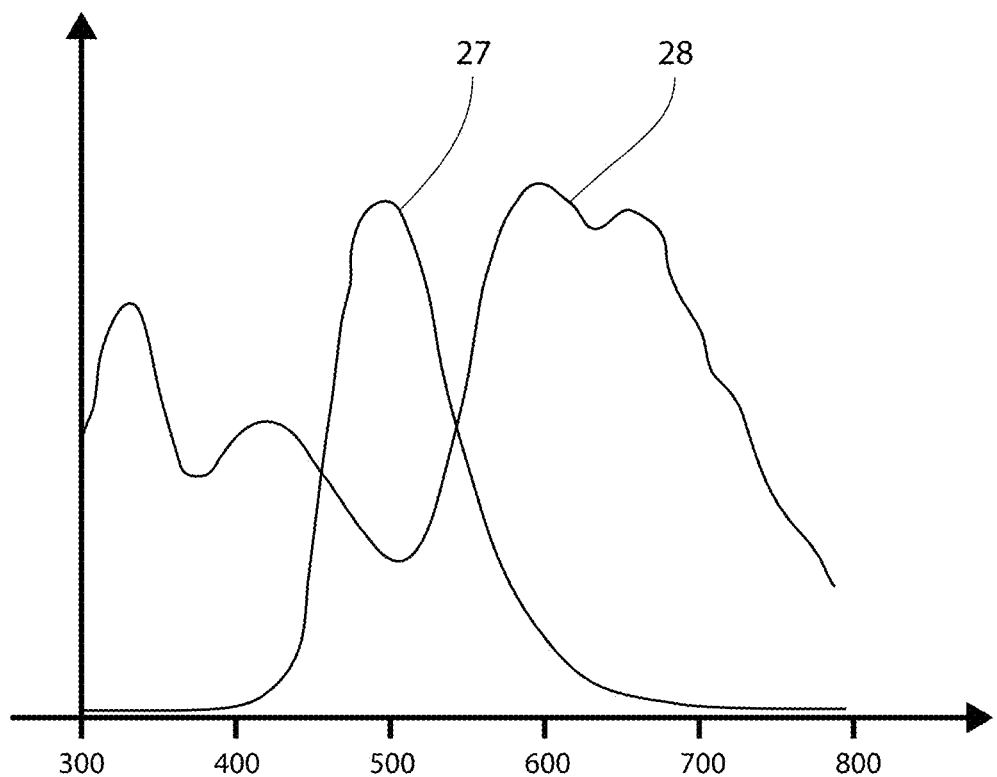

FIG. 11 is a diagram showing characteristics corresponding to the layer configuration in FIG. 9 comprising a third graph 27 showing an approximated example of an emission spectrum of the electroluminescent layer 9 and a fourth graph 28 showing an approximated example of an external quantum efficiency of the photodiode layer 9. It can be seen that a section area between the third graph 27 and the fourth graph 28 is greater than the corresponding section area in FIG. 10, hence the self-excitation may be larger. Self-excitation may cause hysteresis by introducing a positive feedback loop. When the upconversion device is dark, it may require incident infrared illumination of an intensity greater than the fourth threshold T2' to reach an operational state where the intensity of emitted visible light is independent of the intensity of incident infrared illumination, but once it is emitting visible light, some of this may cause self-excitation, hence the intensity of infrared incident illumination can be below the fourth threshold T2' and still maintain the operational state. The first infrared illumination source 3 and/or the second infrared illumination source 4 may be operated to take advantage of such a hysteresis. In a time slot of a duty cycle the first infrared illumination source may in a first interval emit a first intensity of infrared light in the first region of the electromagnetic spectrum and in a subsequent second interval emit light of a second intensity, which may be below the first intensity. Alternatively, the intensity of the first infrared illumination source may be essentially the same throughout a duty cycle and the voltage over the electrodes may be increased during the first interval hence the dark current may be increased an cause emission of visible light. Alternatively, a combination of increasing the voltage during the first interval of a duty cycle and a higher infrared illumination during the first interval of a duty cycle may be comprised. Hence, the average optical power of the infrared light illuminating the observer 1 may be reduced, for example to a level where it is completely eye-safe and on-par with other systems on the market like in another configuration, the pixel 2 may have a layer configuration resulting in a self-excitation with a photon-to-photon efficiency of more than 1 hence once the photodiode layer 8 has been illuminated with infrared illumination within the first spectrum of electromagnetic light of an intensity greater than the fourth threshold T2', the infrared illumination may be switched completely off and the self-excitation will maintain the operational state. In this configuration, an illuminated point may grow over time as light from the point illuminates a nearby region with an intensity causing this region to enter a similar state. In this way, a point may grow in time depending on time constant of the photodiode layer 8 and the electroluminescent layer 9. The voltage over the transparent electrode layer 7 and the electrode layer 10 may after a defined cut-off interval be set low, for example to 0 volt and the cut-off interval may be selected so a point does not spread so much that it cause light in undesired directions, for example towards an eye of a second observer (not shown), to be emitted. In another configuration, the pixel 2 may be configured so the photon-to-photon efficiency of the self-excitation may be below 1, for example 0.9, and the infrared illumination may initially in an interval have an intensity just above the third threshold T1'. Alternatively, the voltage over the electrodes may be increased in the interval. Due to positive feedback the emission may grow until the combined incident infrared and self-excitation reaches the fourth threshold T2'. Hence, an amplification and an essential bi-stable thresholding behavior may be achieved to reduce the requires intensity of the infrared illumination.

Figure 12:
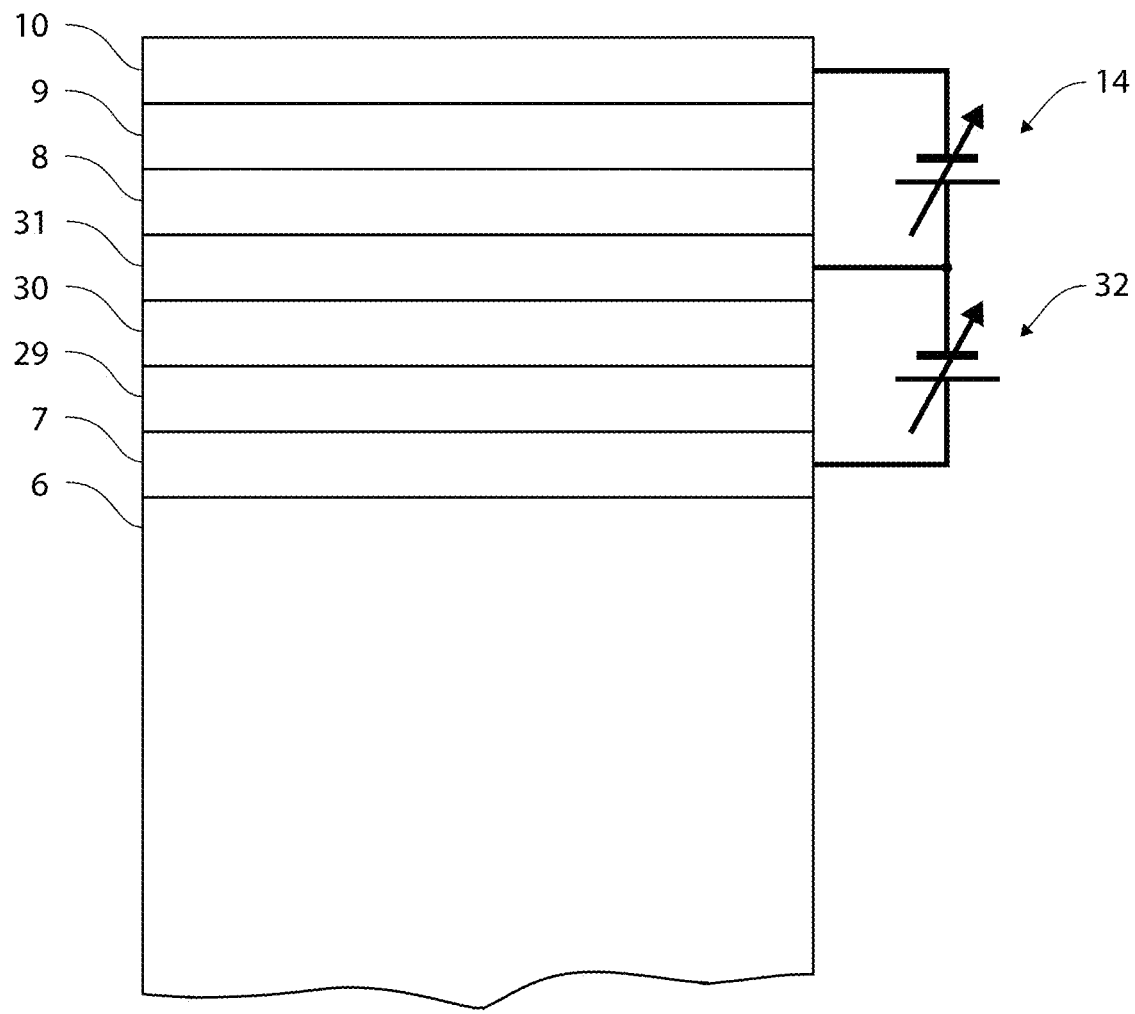

FIG. 12 shows a close up of a section view of an example of another configuration of the thin film layers in the pixel 2 where self-excitation may be used to achieve hysteresis and/or amplification. A second photodiode layer 29, a second electroluminescent layer 30 and a second transparent electrode layer 31 may be comprised between the transparent electrode layer 7 and the photodiode layer 8 as shown. A second voltage source 32 may be comprised and have its cathode connected to the second transparent electrode layer 31 and its anode connected to transparent electrode layer 7. A self-excitation positive feedback loop may exist between the second electroluminescent layer 30 and the second photodiode layer 29 in a similar way to the positive feedback loop described for FIG. 11. The electroluminescent layer 30 may further emit light in a second region of the infrared spectrum than the first infrared illumination source 3 and the second infrared illumination source 4 and the photodiode layer 8 may be sensitive to infrared light in the second region of the infrared spectrum. Further, an optical filter may be located in the optical path between the electroluminescent layer 30 and the observer 1, for example in a front glass in front of a display, and the optical filter may block or have a low transmission for light in the second region of the infrared spectrum, hence the amount of infrared light transmitted in the direction of the observer may be reduced.

Figure 13:
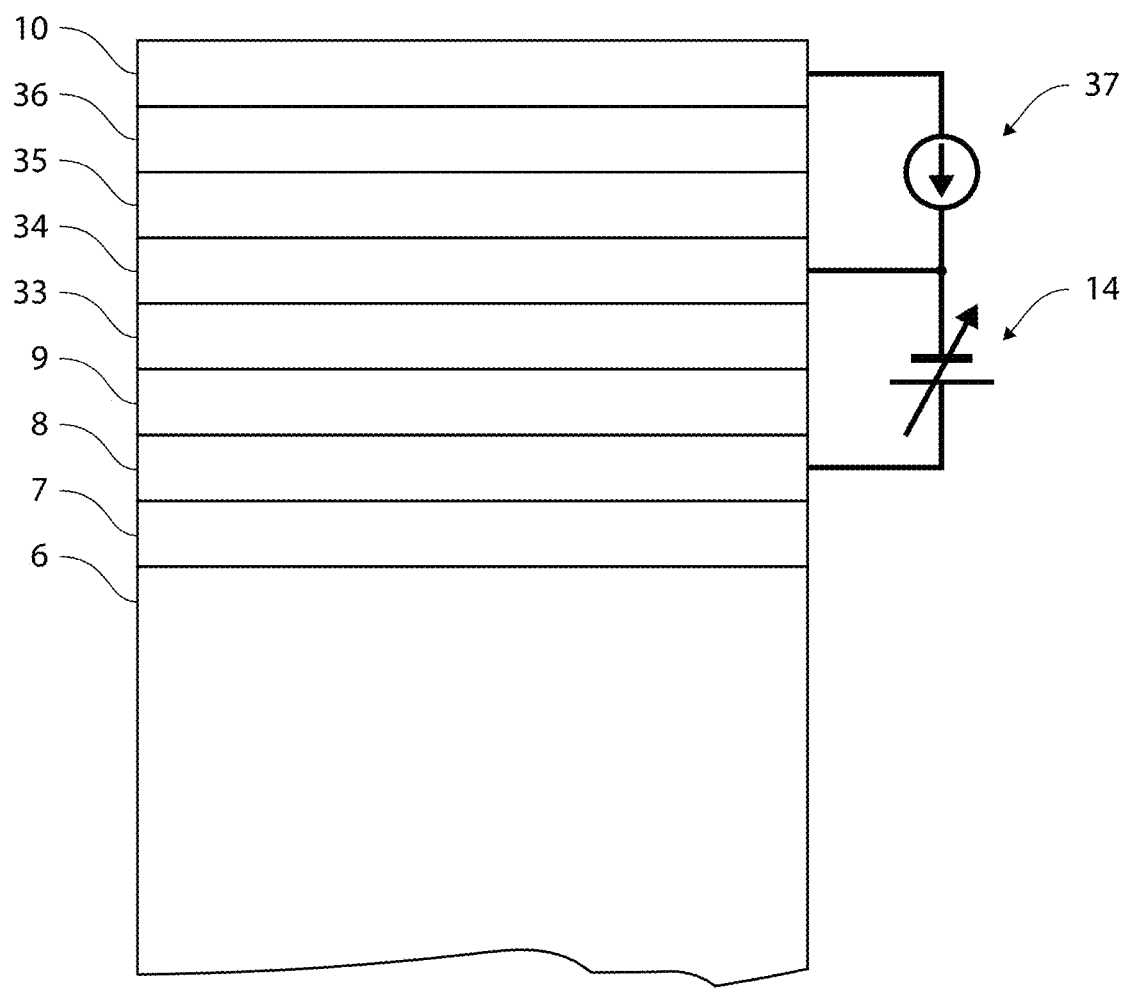

FIG. 13 shows a close up of a section view of an example of another a configuration of the thin film layers in the pixel 2, which may allow for better current control and hence reduce undesired brightness variations as an alternative to the configuration described in FIG. 7. An essentially infrared blocking carrier transporting layer 33, a third photodiode layer 34, a third transparent electrode layer 35 and a third electroluminescent layer 36 may be comprised located as indicated in the drawing. A constant current source 37 may be connected to the electrode layer 10 and the third transparent electrode layer 35 as indicated in the drawing. The third electroluminescent layer 36 may emit essentially uniform and constant infrared light which may cause the third photodiode layer 34 to limit the current density through the photodiode layer 8 to a maximum current density. The constant current source 37 may be variable and may be controlled by the controller 5 hence the maximum intensity of emitted visible light from any point on the electroluminescent layer 9 may be controlled by the controller 5.

Figure 14:
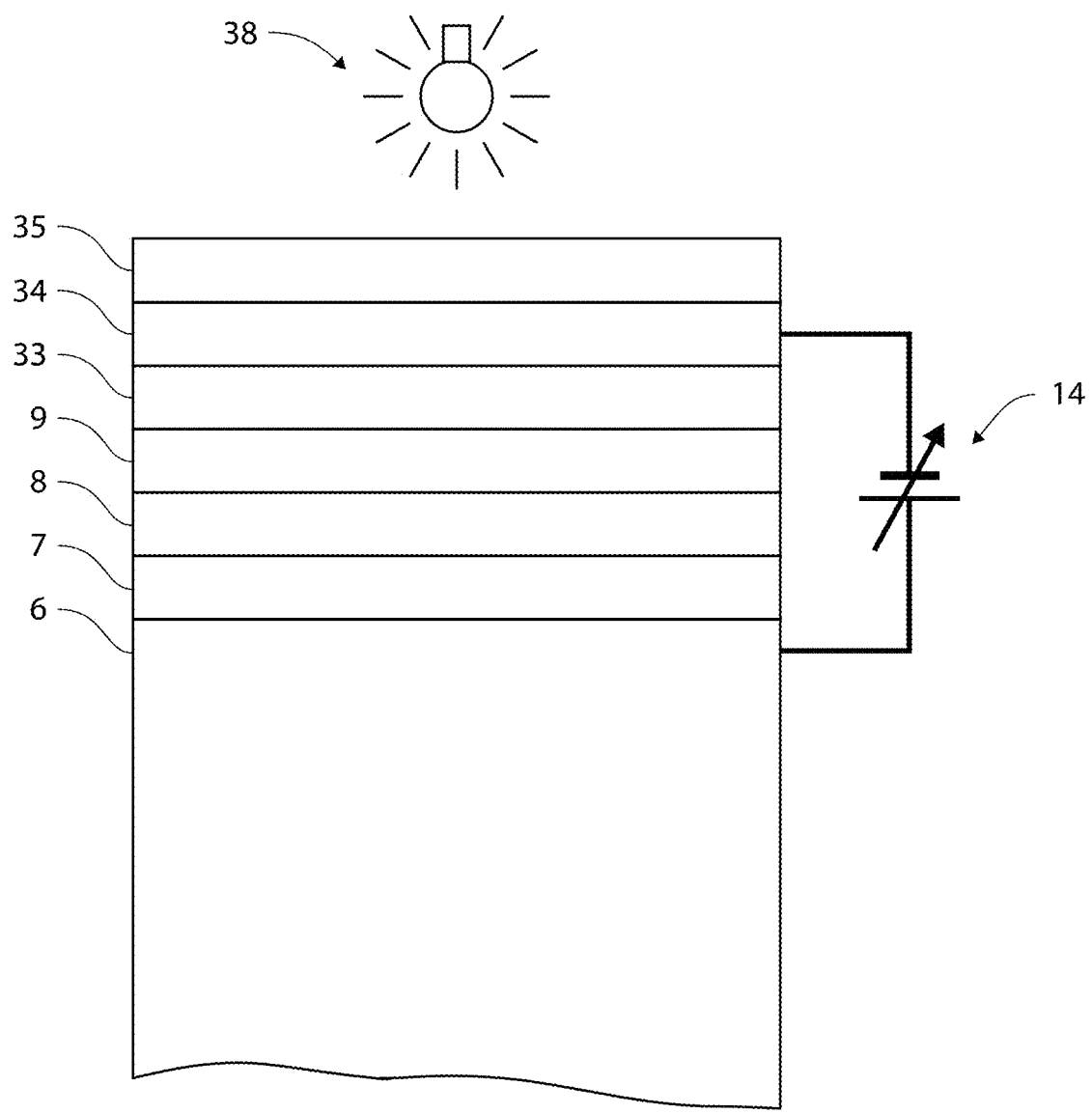

FIG. 14 shows a close up of a section view of an example of an alternative configuration of the thin film layers in the pixel 2 which is similar to the configuration in FIG. 13, except that the third electroluminescent layer 36 and the electrode layer 10 are omitted and a third infrared illumination source 38 is located at the opposite side of the pixel 2 than the observer 1. The third infrared illumination source 38 may illuminate the third photodiode layer 34, which may cause the third photodiode layer 34 to limit the current density in a similar way to the operation described for FIG. 13. Hence, the maximum intensity of emitted visible light from any point from any point on the electroluminescent layer 9 may be controlled by the intensity of the third infrared illumination source 38.

Figure 15:
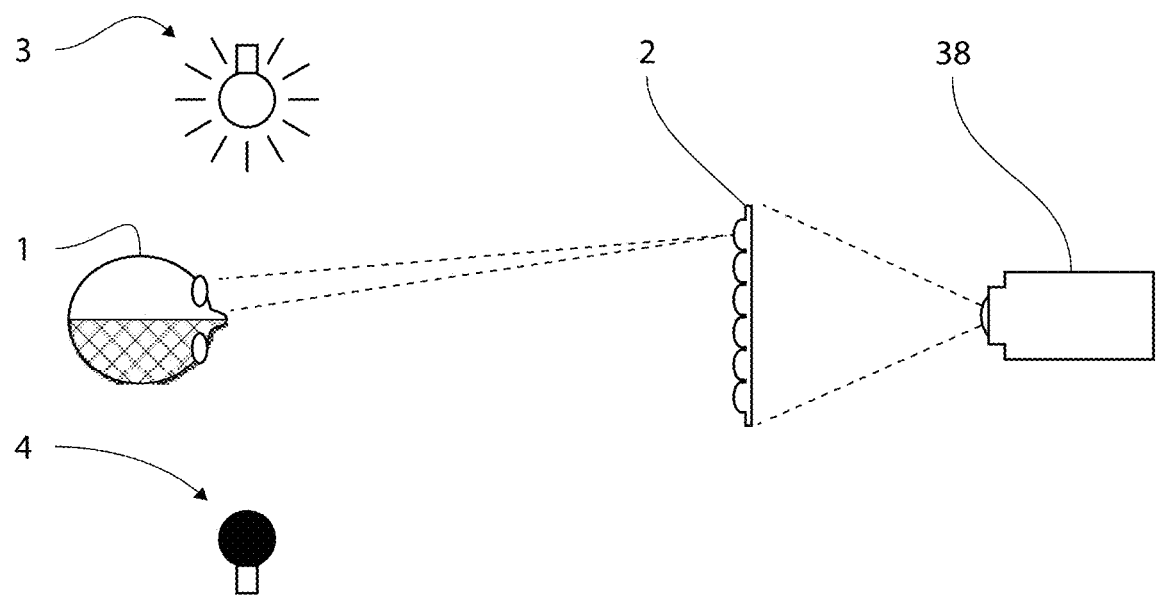

FIG. 15 shows a top view of an example of a configuration similar to the configuration shown in FIG. 14 where the third infrared illumination source 38 may be an infrared projector. The infrared projector may illuminate a plurality of pixels similar to the pixel 2 and may be capable of illuminating a first pixel in the plurality of pixels with a first intensity and illuminating a second pixel in the plurality of pixels with a second intensity. Hence, the observer 1 may observe an image on the plurality of pixels with an eye in a side of his face, which is illuminated by infrared light in a first region of the electromagnetic spectrum. The infrared projector may be capable of projecting images onto the plurality of pixels synchronized with time slots in the duty cycle. For example, the controller 5 may be capable of synchronizing the projector 5 to time slots of the duty cycle or it may be capable of synchronizing time slots of the duty cycle to the projector. Alternatively, the projector may emit light of other regions in the electromagnetic spectrum than infrared. For example, the projector may be a visible light projector and the third photodiode layer 34 may be sensitive to visible light. Alternatively or additionally, a first projector projecting a first image, for example a left eye perspective view and a second projector projecting a second image, for example a right eye perspective, may be comprised. A first light source in the first projector may be capable of being synchronized with time slots in the duty cycle and a second light source in the second projector may be capable of being synchronized with time slots in the duty cycle. Additionally, further projectors may be comprised synchronized with time slots in the duty cycle and more observers may be observing individual perspective views.

Figure 16:
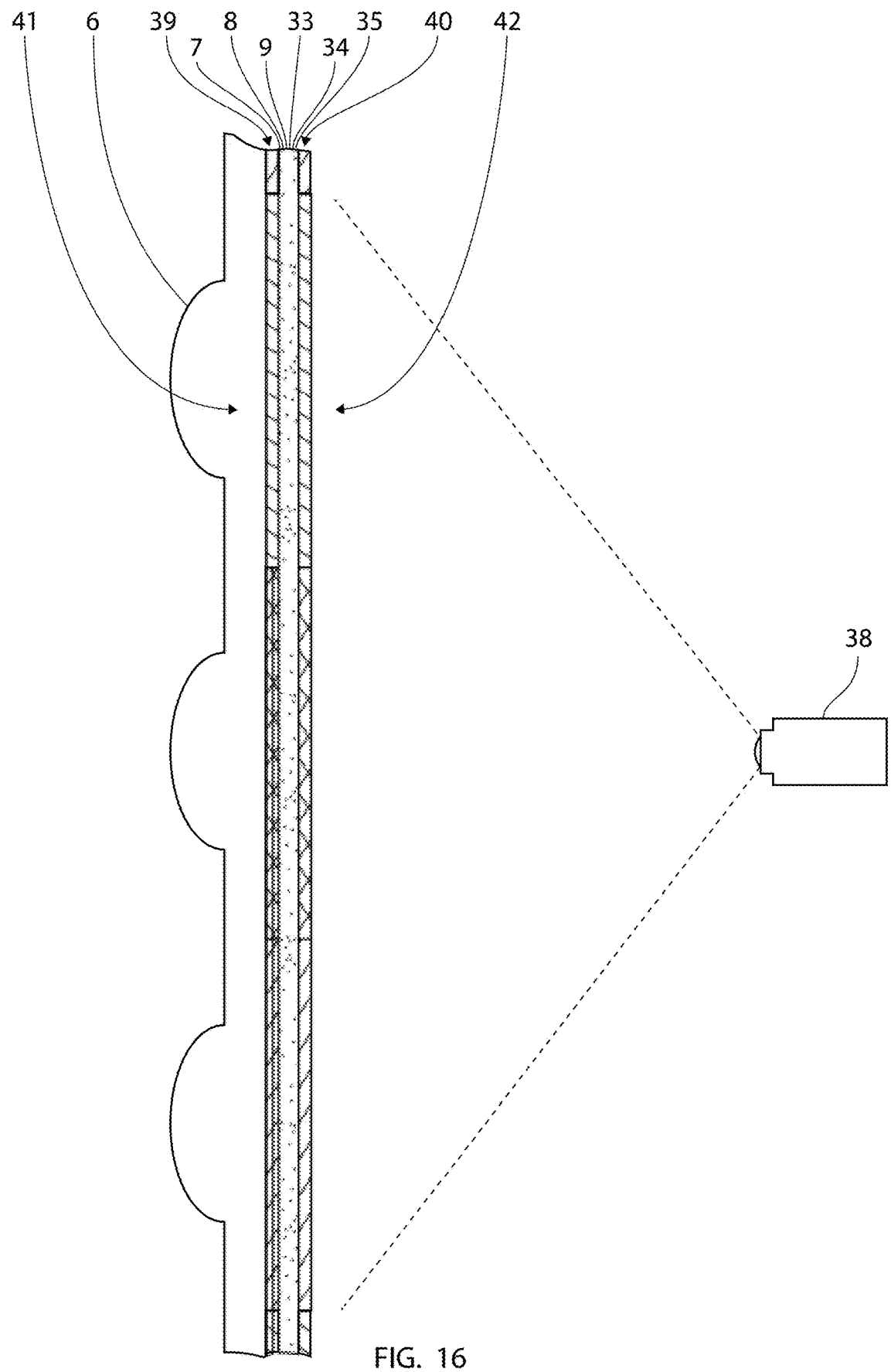

FIG. 16 shows a close up of a section view of an example of another configuration similar to the configuration in FIG. 15 where a first color filter mask 39 may be comprised. The photodiode layer 34 may in this configuration be a broadband photodiode, which may be sensitive to light of wavelengths in the visible part of the electromagnetic spectrum. The essentially infrared blocking carrier transporting layer 33 may be replaced by a carrier transporting layer blocking light of wavelengths in the visible part of the electromagnetic spectrum. The electroluminescent layer 9 may be configured to emit white light, for example configured similarly to an electroluminescent layer in a traditional white OLED (WOLED) display. The first color filter mask 39 may comprise color filters, which may be configured in a similar way as in the configuration shown in FIG. 4. Additionally, a second color filter mask 40 may be comprised. The second color filter mask 40 may be essentially similar to the first color filter mask 39 and it may be located on the side of the third transparent electrode layer 35 facing towards the projector. The second color filter mask 40 may be aligned with the first color filter mask 39, i.e. it may be located so a first color filter 41 in the first color filter mask 39 is essentially adjacent to a second color filter 42 in the second color filter mask 40 where the first color filter 41 may be of essentially the same color as the second color filter 42. The projector 38 may be a color projector capable of simultaneously projecting a first color plane image, a second color plane image and a third color plane image. The color plane images may be for example essentially red, green and blue images. The first color filter mask 39 may comprise color filters of colors corresponding to colors of the first, second and third color plane images and the second color filter mask 40 may comprise color filters of colors corresponding to colors of the first, second and third color plane image. Hence, a red color plane image projected by the projector 38 may be filtered through red filters in the second color filter mask 40 and cause emission of white light in areas of the electroluminescent layer 9 adjacent to the red color filters in the second color filter mask 40 which may then be transmitted through a red color filter in the first color filter mask 39, since the red color filters of the first color filter mask 39 and the red color filters of the second color filter mask 40 may be aligned. Hence, a red color plane image projected by the projector 38 may be visible as a red image on the side of the plurality of pixels facing the observer 1 by an eye in a side of his face, which is illuminated with infrared light in a first region of the electromagnetic spectrum. Similarly, a green color plane image projected by the projector 38 may be visible as a green image on the side of the plurality of pixels facing the observer 1 by an eye in a side of his face, which is illuminated with infrared light in a first region of the electromagnetic spectrum. Similarly, a blue color plane image projected by the projector 38 may be visible as a blue image on the side of the plurality of pixels facing the observer 1 by an eye in a side of his face, which is illuminated with infrared light in a first region of the electromagnetic spectrum. Hence, a color image projected by the projector 38 may be visible as a color image on the side of the plurality of pixels facing the observer 1 by an eye in a side of his face, which is illuminated with infrared light in a first region of the electromagnetic spectrum. It is noted that the drawing is not to scale and the thin film layers may be much thinner relative to the lenses than shown and the distance from the projector to the lenses may be much greater than shown.

Figure 17:
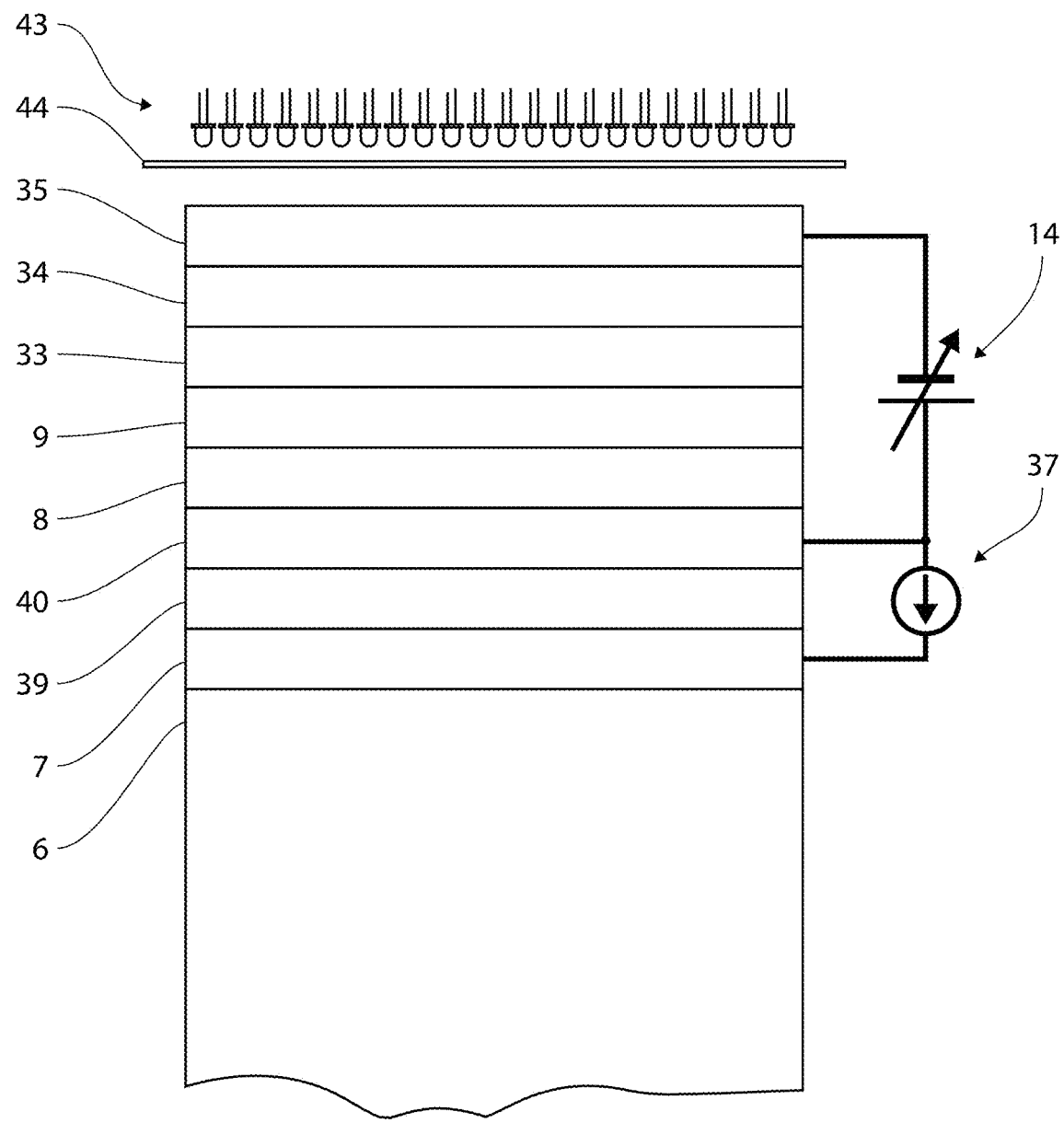

FIG. 17 shows a close up of a section view of an example of an alternative configuration of the pixel 2, where there may be no infrared illumination of the observer 1 and where the direction of emitted visible light is instead controlled by an array 43 of light emitting or transmitting elements, which may be for example a micro LED array or an OLED display. The light emitting or transmitting elements may be located at the side of the third transparent electrode layer 35 on the side facing away from the observer. The configuration of the thin film layers may be similar to the configuration shown in FIG. 14 with the modification that a third infrared emitting electroluminescent layer 39 may be deposited on the transparent electrode layer 7 at the side facing away from the microlens 6 and a fourth transparent electrode layer 40 may be deposited onto the third electroluminescent layer 39 at the side facing away from the microlens 6. The constant current source 37 may be connected with its anode to to the transparent electrode layer 7 and with its cathode to the fourth transparent electrode layer 40. An infrared diffuser 44, for example a diffusing sheet, may be comprised between the third transparent electrode 35 and the array 43. Hence, it may reduce artifacts in corresponding viewing angles to gaps between light emitting or transmitting elements. Additionally or alternatively, light emitting or diffusing elements in the array 43 may have very small gaps. They may for example be OLEDs with electrodes located so close to each other that lateral currents cause illumination from areas also between electrodes when to adjacent OLEDs are illuminated and they may be operated so a cluster of OLEDs around the desired illumination point are illuminated. A light emitting or transmitting element in the array of light emitting or transmitting elements may illuminate an area of the photodiode layer 34, which may cause visible emission from an adjacent area in the electroluminescent layer 9 and visible light may be transmitted through the microlens 6 in a direction corresponding to the location of the light emitting or transmitting element. The current density may be limited by the photodiode layer 8 and may depend on the intensity of infrared illumination of the photodiode layer 8, which may depend on the infrared emission from the infrared emitting electroluminescent layer 39, which may again depend on the current through the current source 37. Hence, a maximum limit for the current density through the electroluminescent layer 9 may be controlled by the current source 37, which may be a variable current source. The intensity of light emission or transmission from the light emitting or transmitting element may be selected so the illumination of the photodiode layer 34 is high enough that the photodiode layer 34 is not limiting the current density when the current source is adjusted to a maximum current. Hence, the intensity of visible light from the pixel may be controlled by adjusting or modulating the current source 37. The current source may for example be adjusted or modulated by varying the current or by pulse width modulation.

Figure 18:
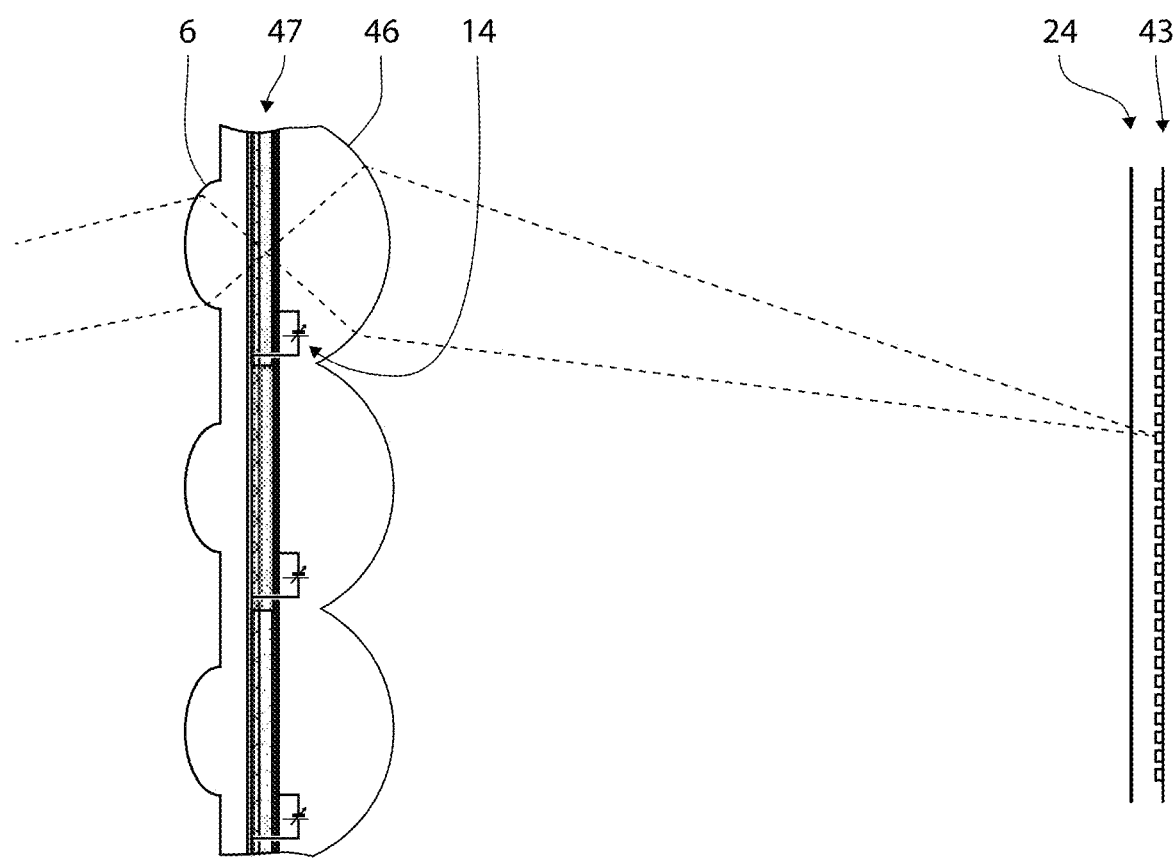

FIG. 18 shows a section view of an example of a configuration similar to the configuration in FIG. 17 but with the modification that a second microlens 46 is located between the array of light emitting or transmitting elements 43 and a thin film stack 47, which may comprise thin film layers configured as shown in FIG. 17. Further a color filter mask 45 may be comprised in a similar manner to the configuration shown in FIG. 4. The second microlens 46 may be designed to have optical properties so it can focus an image of the array 43 onto the thin film layers. It may further be designed so it can compensate for an offset location of the array 43 with respect to a center location of the second microlens 46. Hence, it may exhibit a prismatic property in addition to an optical power. Hence another pixel than the pixel 2 in a different position may project essentially identical images of the array 43 onto the thin film layers of the other pixel. Hence a plurality of pixels may project essentially identical images of the array 43 onto the a layer of thin films and hence emit visible light in essentially the same direction. Such a plurality of pixels and the array 43 may comprise a display module capable of displaying an image or a part of an image in a direction controlled by the array 43. The direction of emitted light from such a display module may be calculated by a display module controller, which may be capable of controlling the array 43. A display may comprise a plurality of such display modules and the display module controller may be capable of controlling the direction of essentially all comprised display modules in desired directions. Said desired directions may be calculated so essentially all directions are for example towards an eye of the observer 1.

Alternatively, the thin film stack 47 may be essentially similar to the thin film stack shown in FIG. 6 but with the modification that the thin film layer 10 may be configured to be transparent to light emitted from the array 43 of light emitting or transmitting elements and the voltage source 14 may be replaced by a constant current source. The thin film layer 10 may for example be configured according to the description in US patent U.S. Pat. No. 6,875,320 "Highly transparent top electrode for OLED device" filed by Eastman Kodak Company, which is hereby incorporated in the description by reference. The array 43 may emit light in the infrared and/or visible spectrum and the diffuser 44 may diffuse infrared and/or visible light emitted from the array 43. The array 43 may be operated so an area or areas on the diffuser 44 illuminated by the array 43 is essentially constant, for example the number of light emitting elements or light transmitting elements in the array 43, which emits or transmits light towards the diffuser may be essentially constant. Alternatively, the diffuser 44 may be omitted and the array 43 operated so an illuminated area on the array 43 is essentially constant. Hence, an image of light originating from the array 43 and focused by the second microlens 46 onto the thin film layers may have an essentially constant area or constant areas and the current density in the thin film layer stack 47 may essentially be dependent only on the current source so light emitted in a desired direction is essentially dependent only on the current source.

The current source may be modulated and may be comprised in a pixel driver circuit, for example a high speed pixel driver circuit. Hence, the display may be able to operate in a time multiplexed operation having a high frequency duty cycle of for example 240 cycles per second. An example of a high speed pixel driver circuit which may be comprised is described in U.S. Pat. No. 8,941,567 "Pixel and organic light emitting display device using the same" filed by Samsung Display which is hereby incorporated in the description by reference.

The thin film layer 10 may comprise a layer of Ag, for example 12 nm thick or alternatively a layer of Au, for example 8 nm. Further, it may comprise a layer of Alq3 for example 20 nm or 55 nm thick. Since thin layers of Ag and Au have a relatively high transmission of infrared and visible light, which may be further increased by adding for example a layer of Alq3 to reduce reflections, the layer 10 may have a relatively good transmission of visible and NIR light from the array 43.

Additionally, a color filter (not shown) may be comprised, located between the thin film stack and the observer 1. The color filter may essentially block light from the array. Hence, light emitted from the array 43 may essentially not reach an eye of the observer 1 and she may be prevented from seeing visible light from the array 43 or prevented from eye hazards related to exposure of infrared light. The color filter may be located between the microlens 6 and the observer 1. Alternatively or additionally the color filter mask 45 may be selected so it essentially blocks light from the array 43.

The color filter and/or the color filter mask 45 may be located between the microlens 6 and the observer or between the thin film stack 47 and the microlens 6. The microlens 6 may be designed for wavelengths corresponding to wavelengths being transmitted through the color filter mask 45 at a position of the color filter mask adjacent to the microlens 6. The second microlens 46 may be designed for wavelengths emitted from the array 43. The microlens 6 may be a refractive lens or a diffractive optical element. The second microlens 46 may be a refractive lens or a diffractive optical element.

A display may comprise a plurality of configurations according to FIG. 18, which may be tiled modules with low perceptible of invisible seams. A first module of amongst the modules may emit light in a first direction and a second module amongst the modules may emit light in a second direction and the first direction may be different from the second direction. For example, the first direction may be a direction from the first module towards a first eye of an observer and the second direction may be a direction from the second module towards a first eye of an observer. The thin film stack 47 may be part of a first display structure shared by the modules. The array 43 may be part of a second display structure shared by the modules. The second display structure may be an OLED display, for example a direct addressed OLED display, a passive matrix OLED display or an active matrix OLED display. The second display structure may be configured to emit visible or infrared light. The array 43 may be operated synchronously with an adjacent array on the second display structure and they may operate so they essentially are illuminated with an identical patterns, they may for example have corresponding light emitting elements galvanically coupled. Hence, the number of driving circuits and the complexity of addressing logic may be reduced. The first display structure may comprise the thein film stack 47. It may further comprise a passive matrix electrode structure. Alternatively, it may comprise an active matrix structure, for example an active matrix driving backplane, which may comprise pixel driver circuits which may be lithographically created in for example amorphous silicon or low temperature polysilicon. Pixel driver circuits may be located outside of areas where light from the array 43 is focused onto the second lens 46. The array 43 may be synchronized with an update pattern of the first display structure, for example so it is not illuminated when adjacent pixels on the first display structure is being updated, i.e. when they are in a transition phase, and so the illuminated pattern corresponds to an emission angle from the lens 6 towards an eye of an observer, for which the light of the adjacent pixel is intended. For example, the first display structure may have a rolling update of the pixels and the second display structure may have an update pattern which is essentially synchronized to the rolling update pattern, hence pixel values and pixel emission direction update is synchronized. This has the advantage that most of the pixels on a display according to the present invention can be illuminated at any time as opposed to a typical 3D stereo operation with shutter glasses, where for example a video frame is shown for two consecutive frames and the shutter glasses only allows observation during the second update where an identical video frame is displayed on all of the pixels simultaneously, and hence provides a higher efficiency than typical shutter glasses operations. It is noted that the efficiency further may be higher due to the fact that light may be emitted essentially towards eyes of observers and not in unnecessary directions, which is a general advantage of the present invention.

Figure 19:
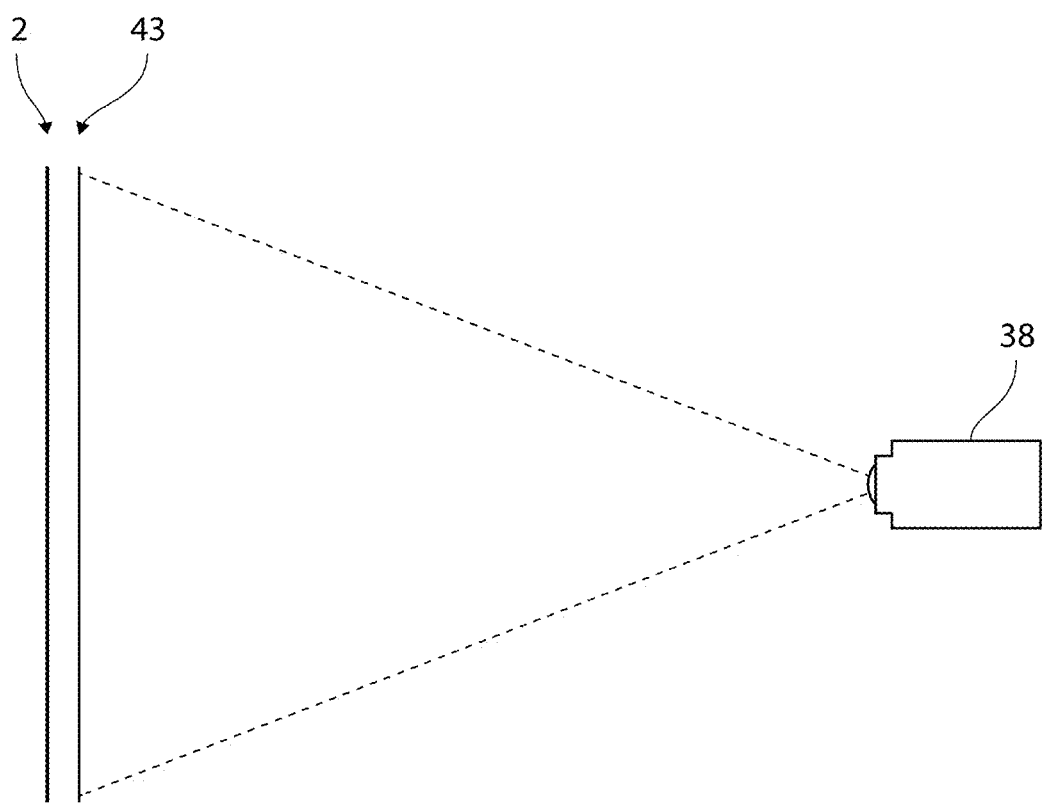

FIG. 19 shows a top view of an example of a configuration similar to the configuration of FIG. 18 with the modification that the array 43 may be transparent to visible light and that pixels may be optically addressed with a projector 38. The projector may be a full color projector and a color filter may be comprised in the pixel 2. A detailed description follows below.

Figure 20:
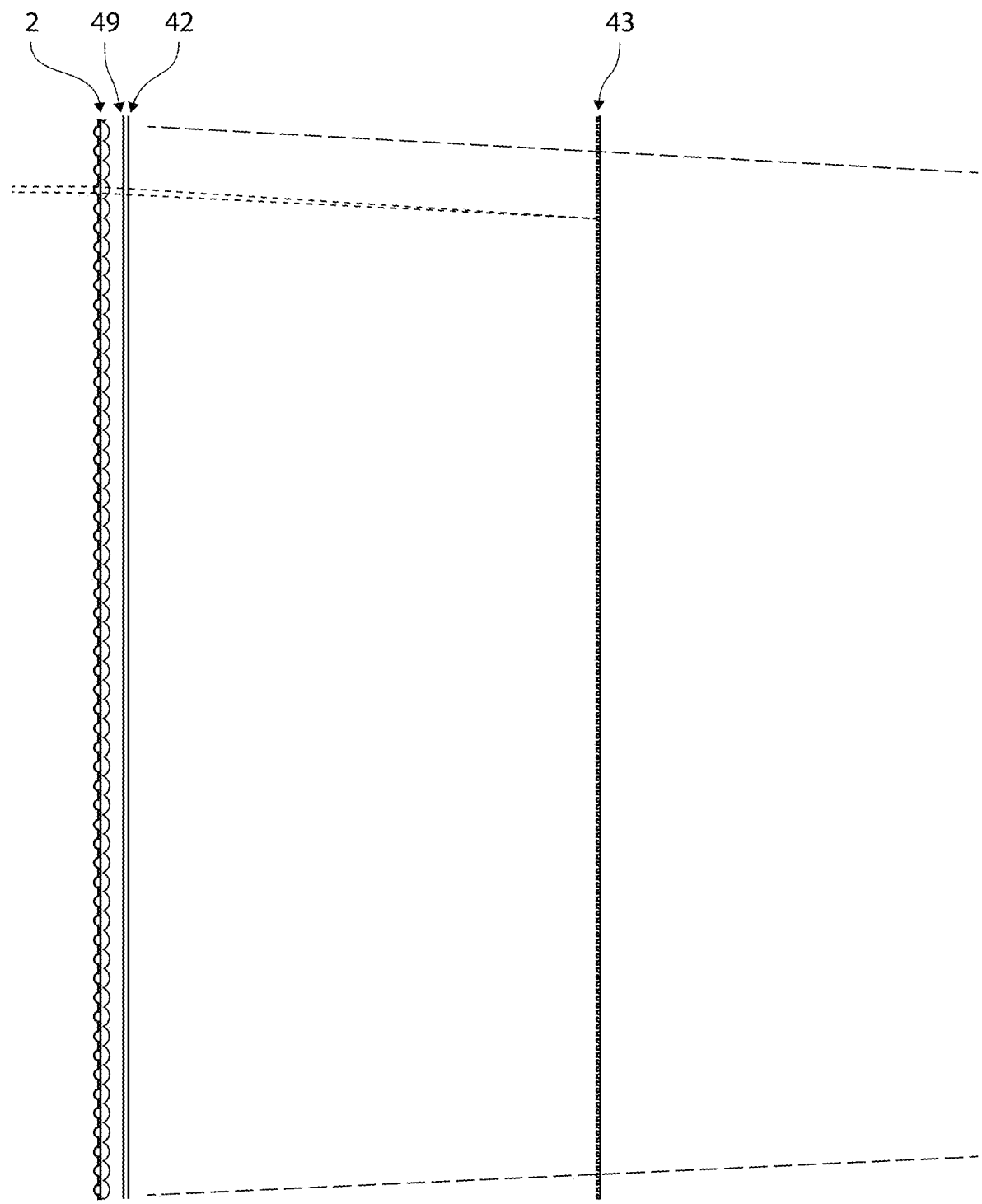

FIG. 20 shows a close up of a top view of the pixel 2 and the array 43 of the configuration shown in FIG. 19. A detailed description is included below.

Figure 21:
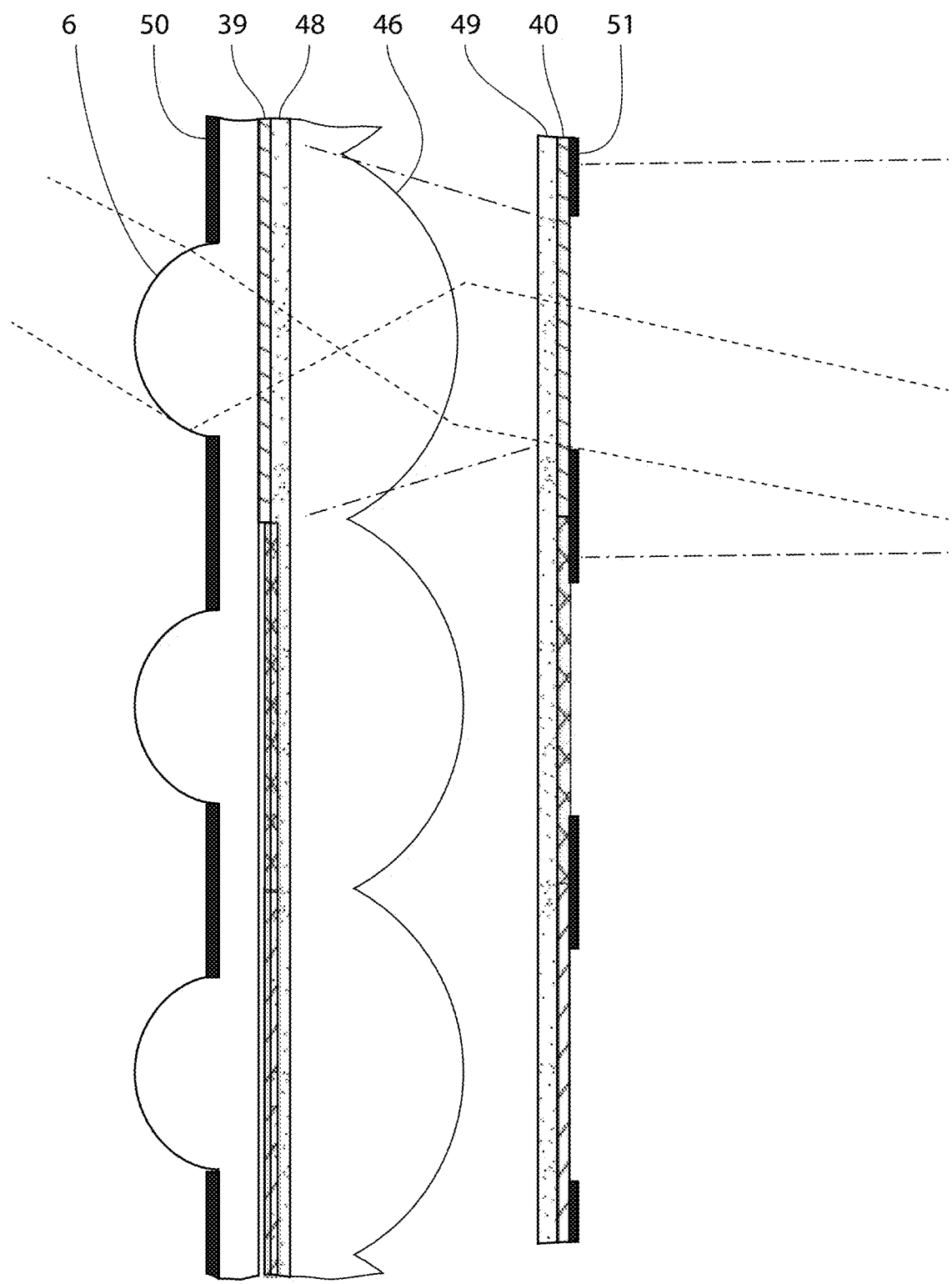

FIG. 21 shows a close up of a section view of the configuration shown in FIGS. 19 and 20. In this configuration, the pixel 2 may comprise a first thin film stack 48 (not shown in this top view, see close up section view in FIG. 21), which may deposited onto the lens 6 on the side facing towards the projector, where the first thin film stack 48 may be sensitive to both infrared light and to visible light and may emit visible light towards the observer when it is illuminated with both infrared light and visible light from the other side. Further, the pixel 2 may comprise a second thin film stack 49 (not shown in this top view, see close up section view in FIG. 21), which may be located between the second microlens 46 and the array 43 and it may be capable of emitting visible light, for example green light, towards the second microlens 46 in areas where it is illuminated with incident visible light. The second thin film stack 49 may be capable of emitting visible light in a direction which may be different from the direction of incident visible light, for example it may emit light in a range of directions essentially covering the second microlens 46 essentially independent of the direction of incident visible light. Additionally, the second thin film stack 49 may be transparent to infrared light. Hence, the thin film stack 49 may essentially pass infrared light unaltered while it may act essentially as a diffuser to visible light in addition to convert the wavelength of visible light. The second thin film stack 49 may be located at a distance to the second microlens 46 so it is out focus. For example it may be located at a distance corresponding to one tenth of the diameter of the second microlens 46. Hence, it may illuminate the first thin film stack 48 essentially uniformly within an area adjacent to the first microlens 6.

The first color filter mask 39 may be located similarly to the configuration shown in FIG. 16. The second color filter mask 40 may be located between the second thin film stack 49 and the array 43, for example it may be deposited on the second thin film stack 49. An opaque area 51 may be comprised to reduce or eliminate crosstalk. The opaque area 51 may for example form an aperture opening around a color filter in the second color filter mask 40. The array 43 may be transparent to visible light, for example it may be comprised in a transparent infrared OLED display, and the projector 38 may project a visible light image. Hence, the pixel 2 may emit light in a direction controlled by the array 43 and of an intensity controlled by the intensity of a point in the visible image projected onto the pixel 2. The first color filter mask 39 and the second color filter mask 40 may be aligned in a similar way to the configuration shown in FIG. 16. Hence, a color image projected by the projector 38 may be visible to an eye of the observer 1 located in a direction controlled by the array 43 as a color image. The projector 38 may be a high speed full color projector such as the above mentioned Fujitsu Dynaflash projector. Alternatively, a number of slower speed projectors with time multiplexed light sources may be comprised, where the projectors may be capable of being timemultiplexed without artifacts, for example they may be using other types of pixel modulation than pulse width modulation for example intensity modulation for example using a liquid crystal spatial light modulator. Hence, with a plurality of pixels similar to the pixel 2, a full color time multiplexed directional OLED display capable of a high frame rate may be provided. The advantage of this configuration is further that it can be manufactured without an OLED facility capable of construction patterned electrodes or thin film pixel driver circuits, such as an OLED fab, but can be manufactured using only facilities designed for OLED lighting and organic photovoltaic cells.

Figure 22:
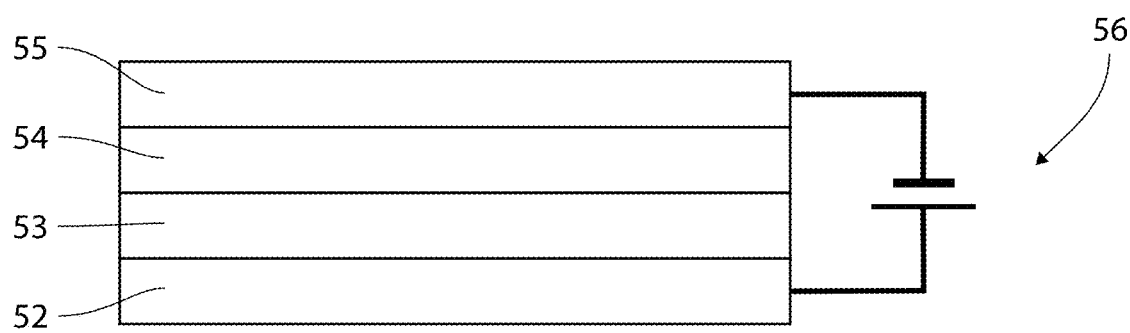

FIG. 22 shows a close up of a section view of an example of a configuration of the second thin film stack 49. A fifth transparent electrode layer 52 may be comprised. Further, a fourth electroluminescent layer 53, which may be capable of emitting visible light, for example green light, may be comprised for example deposited on the fifth transparent electrode layer 52 on the side facing away from the second microlens 46. Further, a fourth photodiode layer 54 capable of sensing infrared light may be comprised for example deposited on the fourth electroluminescent layer 53 on the side facing away from the fifth transparent electrode layer 52. Further, a sixth transparent electrode layer 55 may be comprised for example deposited on the fourth photodiode layer 54 on the side facing away from the fourth electroluminescent layer 53. Additionally, a charge transporting layer which may transmit infrared light and essentially block visible light may be comprised, located between the fourth electroluminescent layer 53 and the fourth photodiode layer 54. The photodiode layer 54 may be a broadband photodiode having a sensitivity, which is higher in the visual spectrum than in the infrared spectrum, for example it may essentially be equally sensitive to light of wavelengths in the visible spectrum and essentially not sensitive to infrared light. Hence, when the second thin film stack XX for example receives incident visible light from the projector 38 through the second color filter mask 40, it may emit diffuse green light towards the second microlens 46 and the diffuse green light may illuminate an area on the first thin film stack 48 adjacent the second microlens 6 and infrared light from the array 43 may pass through the second thin film stack 49 and an infrared image of the array 43 may be projected onto the first thin film stack 48 by the second microlens 46.

Figure 23:
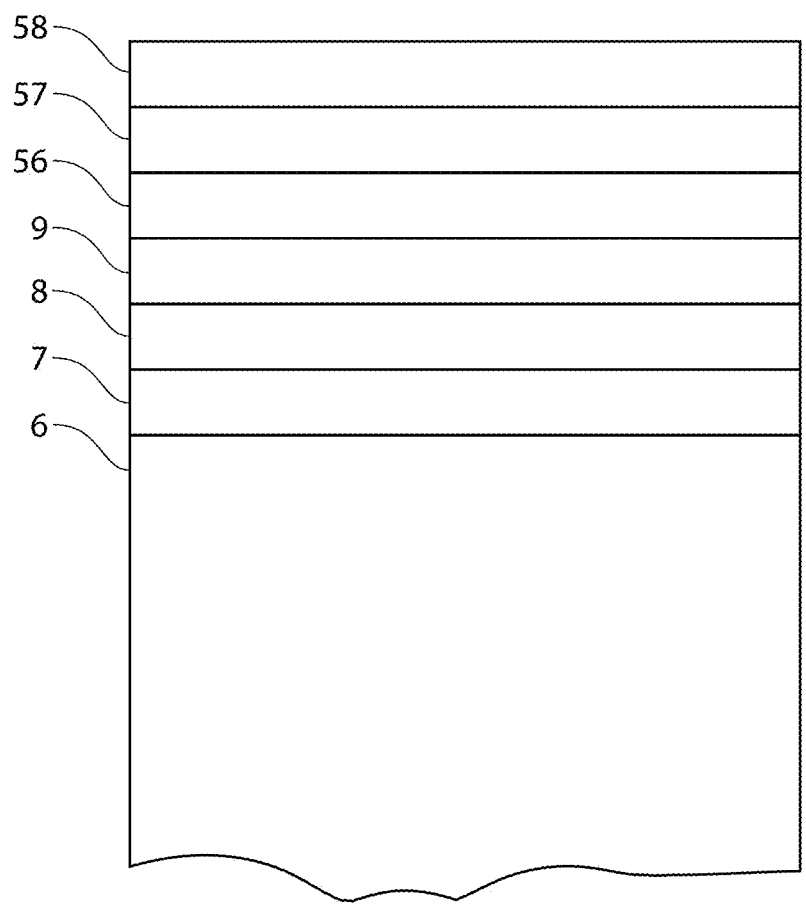

FIG. 23 shows a close up of a section view of an example of a configuration of the first thin film stack 48. The electroluminescent layer may emit white light, it may for example be an OLED stack. A visual blocking layer 56 which may block visual light and transmit infrared light and which may be carrier transporting may be deposited on the electroluminescent layer 9 on the side facing away from photodiode layer 8. Further, a fifth photodiode layer 57 may deposited on the visual blocking layer 56 on the side facing away from the electroluminescent layer 9. The fifth photodiode layer 57 may be sensitive to light in the visual spectrum, for example to green light and it may be essentially insensitive to infrared light. A sixth transparent electrode layer 58 may be deposited on the fifth photodiode layer 57 on the side facing away from the visual blocking layer 56. Hence, the first thin film stack 48 may emit white light towards the lens 6 dependent on incident green and infrared light from the other side: in areas where it receives both incident green light and infrared light it may emit white light and in other areas it may be dark, and the intensity of the emission of white light may depend on the weaker of the green and the infrared illuminations, hence, if the infrared light is modulated binary in an on/off manner, then the green light may modulate the intensity of emitted white light within an interval.

Figure 24:
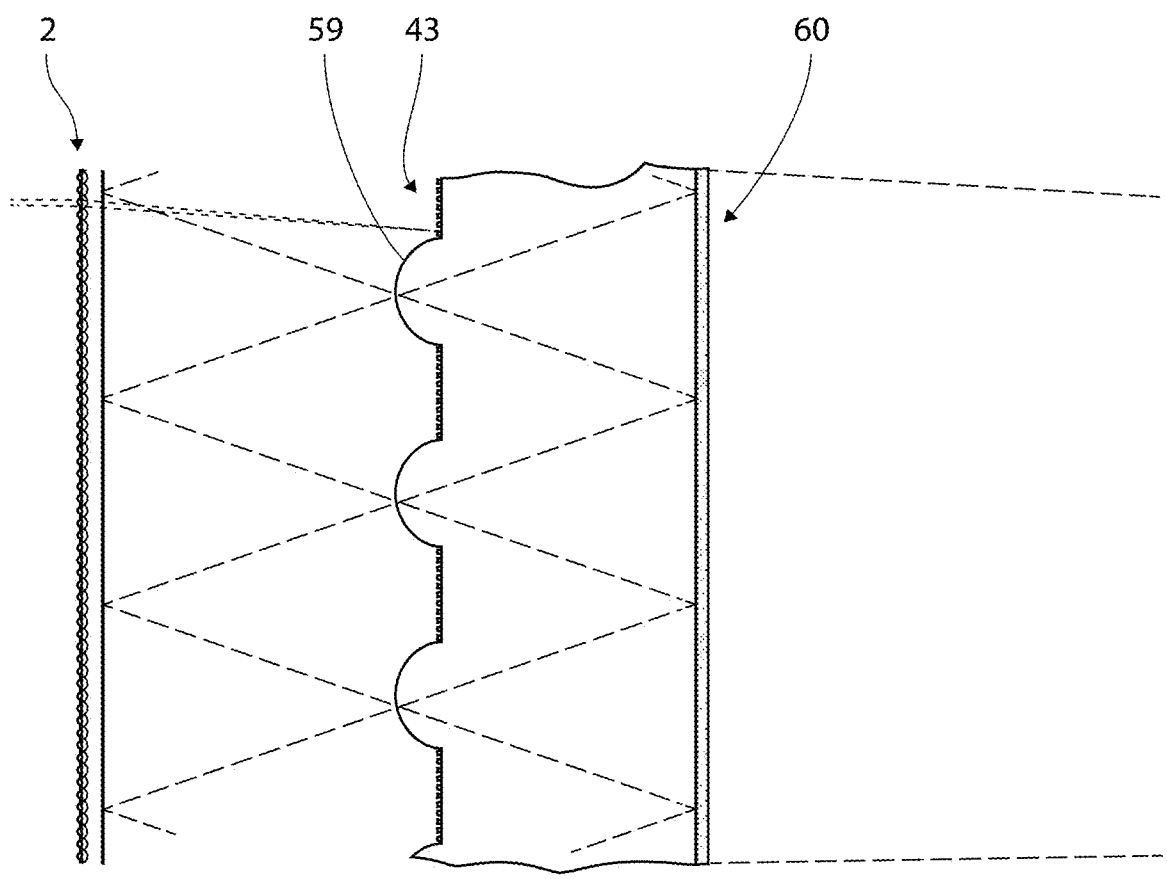

FIG. 24 shows a close up of a section view of an example of a configuration similar to the configuration shown in FIG. 23 with the modification that the array 43 may be non-transparent to visible light, and a third microlens 59 is comprised located between the second thin film stack 49 and the projector 38 and a second diffuser 60 is comprised located between the third microlens 59 and the projector 38, so an image on the diffuser may be focused on the second thin film stack 49. The projector 38 may project an image onto the diffuser 60. The third microlens 59 may project an image of an image on the diffuser onto the second thin film stack 49. The third microlens may be configured so an image projected onto the second thin film substrate overlaps with an image from an adjacent similar configuration. The projector may project a plurality of images onto the diffuser and the plurality of images may be focused onto the second thin film stack by a plurality of microlenses similar to the third microlens 59. An image processor (not shown) may warp and blend images in the plurality of images so the plurality of images overlap and blend together essentially to one image on the second thin film diffuser. The image processor may comprise software for slicing, warping and blending images for overlapped projection. The output of the software may be in the form of separate images for projection and additional software may tile the output images into a single image for projection by the projector 38.

Figure 25:
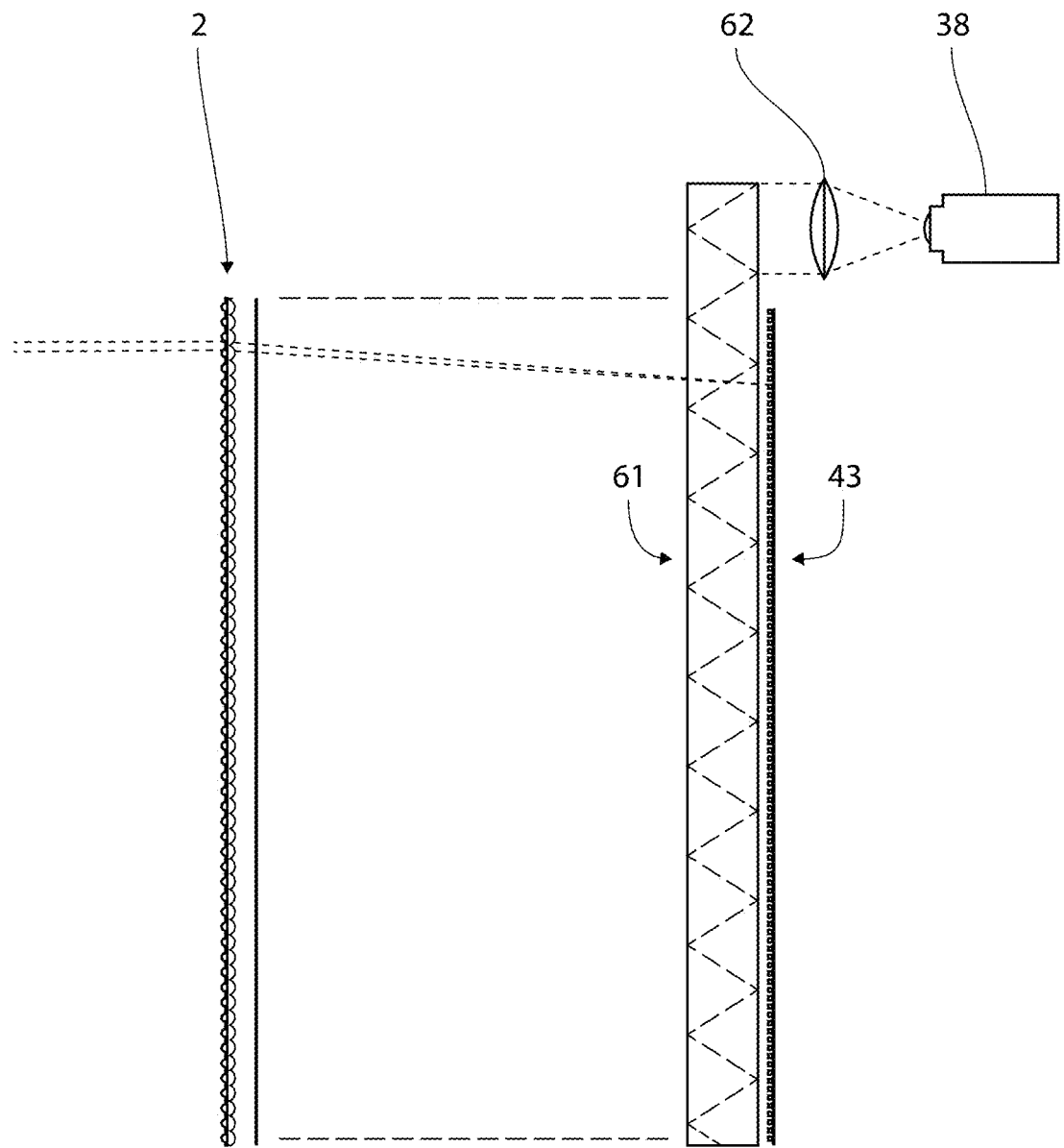

FIG. 25 shows a top view of an example of a configuration similar to the configuration shown in FIG. 23 with the modification that the array 43 may be non-transparent to visible light and a waveguide 61 is located between the array 43 and the second thin film stack 49 and the projector 38 may be projecting an image into the in-coupling of the waveguide 61 and a focusing lens 62 may further be comprised located between the projector 38 and the in-coupling of the waveguide 61. The waveguide may be transparent to infrared light hence infrared light from the array 43 may be emitted essentially unaltered through the waveguide 61. The out-coupling of the waveguide 61 may be essentially facing the second thin film stack 49 so. Hence, the projector 38 may project a visible light image through the wave guide onto the second thin film stack 49 through the second color filter mask 40 and the second microlens 46 may project an infrared image of the array 43 onto first thin film stack 48.

Figure 26:
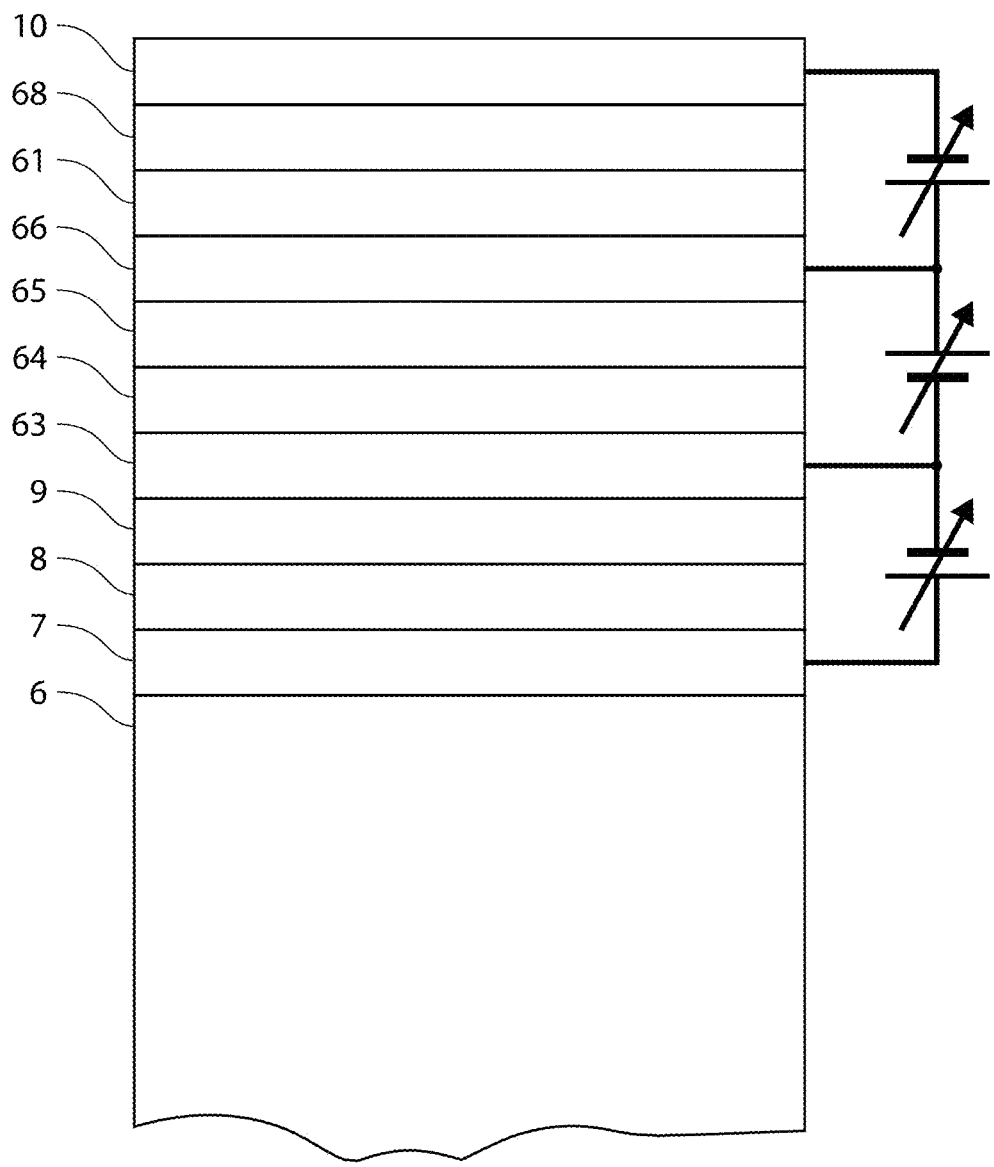

FIG. 26 shows a close up of a cross section of an example of a configuration similar to the configuration with the modification that it may enable color emission with vertically stacked color OLED layers. In the description of this configuration the phrase "on top of" shall mean "on the side facing away from the microlens 6" instead of having any meaning with respect to gravity. The electroluminescent layer 9 may be configured so it is capable of emitting blue light. On top of the electroluminescent layer 9 may be deposited a sixth transparent electrode layer 63. On top of the sixth transparent electrode layer 63 may be deposited a sixth photodiode layer 64. On top of the sixth photodiode layer 64 may be deposited a sixth electroluminescent layer 65 which may be configured so it is capable of emitting green light. On top of the sixth electroluminescent layer 65 may be deposited a seventh transparent electrode layer 66. On top of the seventh transparent electrode layer 66 may be deposited a seventh photodiode layer 67. On top of the seventh photodiode layer 67 may be deposited a seventh electroluminescent layer 68 which may be configured so it is capable of emitting red light. On top of the seventh electroluminescent layer 68 may be deposited the electrode layer 10.

Figure 27:
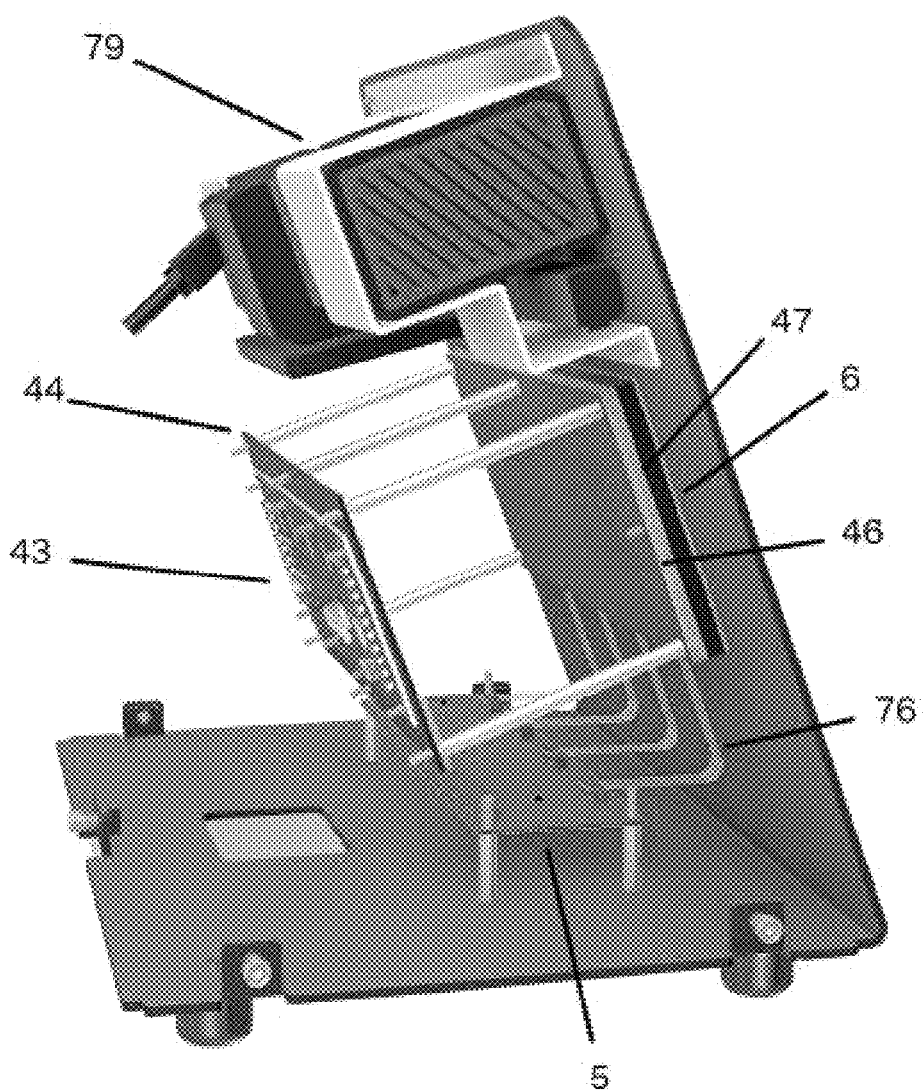

FIG. 27 shows a rear perspective view of an example of an implementation of a configuration comprising the pixel 2 according to the configuration described in FIG. 18.

The configuration of FIG. 27 comprises a plurality of pixels for forming a display for displaying an image to an observer. The configuration of FIG. 27 constitutes a prototype display system.

The observer 1 (not shown here) may be located to the right of the display system in the figure, i.e. at viewing side (front side) of the display system In general the display system may define a viewing direction, which is the direction towards the viewing side.

Throughout this document, the term "addressing light element" may be used synonymously to refer to the array of light emitting or transmitting elements 43 and the term "addressing pixel" may be used to refer synonymously to a light emitting or transmitting element in the array of light emitting or transmitting pixels 43.

The display system may comprise a thin film stack 47, which may be configured according to the article "Solution-Processed Organic Optical Upconversion Device", Strassel et. al, Lausanne, Switzerland, published by American Chemical Society, Jun. 10 2019.

The display system may comprise an observer tracking system such as an eye tracking system 79, which may be similar to the eye tracking or observer tracking system described in the description of FIG. 1B. It may for example be a Microsoft Kinect™.

The eye tracking system may comprise a camera, which may face in the direction towards an observer.

The eye tracking system 79 may output tracking data to the controller 5. The controller 5 may calculate direction and/or angular data for emitted visible light. This data may be used to control an addressing light element 43 having a plurality of addressing arrays, each addressing array having a plurality of addressing pixels, which in turn may control/define the direction of emitted visible light as explained in more detail below.

The addressing light element such as an array of light emitting or transmitting elements 43 may comprise at least one addressing pixel such as a light emitting diode, which may have an emission spectrum with a center wavelength between 720 nm and 740 nm. A photodiode or photo sensitive layer of the thin film stack may be sensitive to wavelengths within this range.

Preferably, the addressing light element may comprise a plurality of addressing pixels.

Alternatively the addressing light element 43 may comprise at least one addressing pixel such as a light emitting diode, which may have an emission spectrum with a center wavelength between 960 nm and 1000 nm.

A diffuser 44 may be configured so it essentially eliminates dark areas between light emitting or transmitting elements in the array of light emitting or transmitting elements as observed from the the microlens 46.

The diffuser 44 may be located in front of the addressing light element 43 relative to the viewing direction of the display system, i.e. the diffuser is closer to the observer than the addressing light element 43.

Further the diffuser 44 may increase uniformity of illumination intensity of lenses located between the thin film stack 47 and the array of light emitting or transmitting elements 43. The diffuser 44 may comprise a circular symmetric diffuser, an elliptic diffuser and/or a batwing diffuser.

The thin film stack 47 may be adapted for minimizing lateral carrier diffusion hence reducing point spread and enabling very small optically addressed sub-pixels which may in turn enable a high angular resolution of the pixel 2 even for small pixels.

A photodiode or photosensitive layer of the thin film stack may be adapted for minimizing dark current, hence increasing the on/off ratio of the upconversion performed by the thin film stack 47 and hence decreasing crosstalk in displayed 3D images. Reference is made to the article "Long-Term Stable Organic Photodetectors with Ultra Low Dark Currents for High Detectivity Applications", Kielar et. al, December 2016, published in Nature, Scientific Reports, volume 6, article number 39201.

Figure 28:
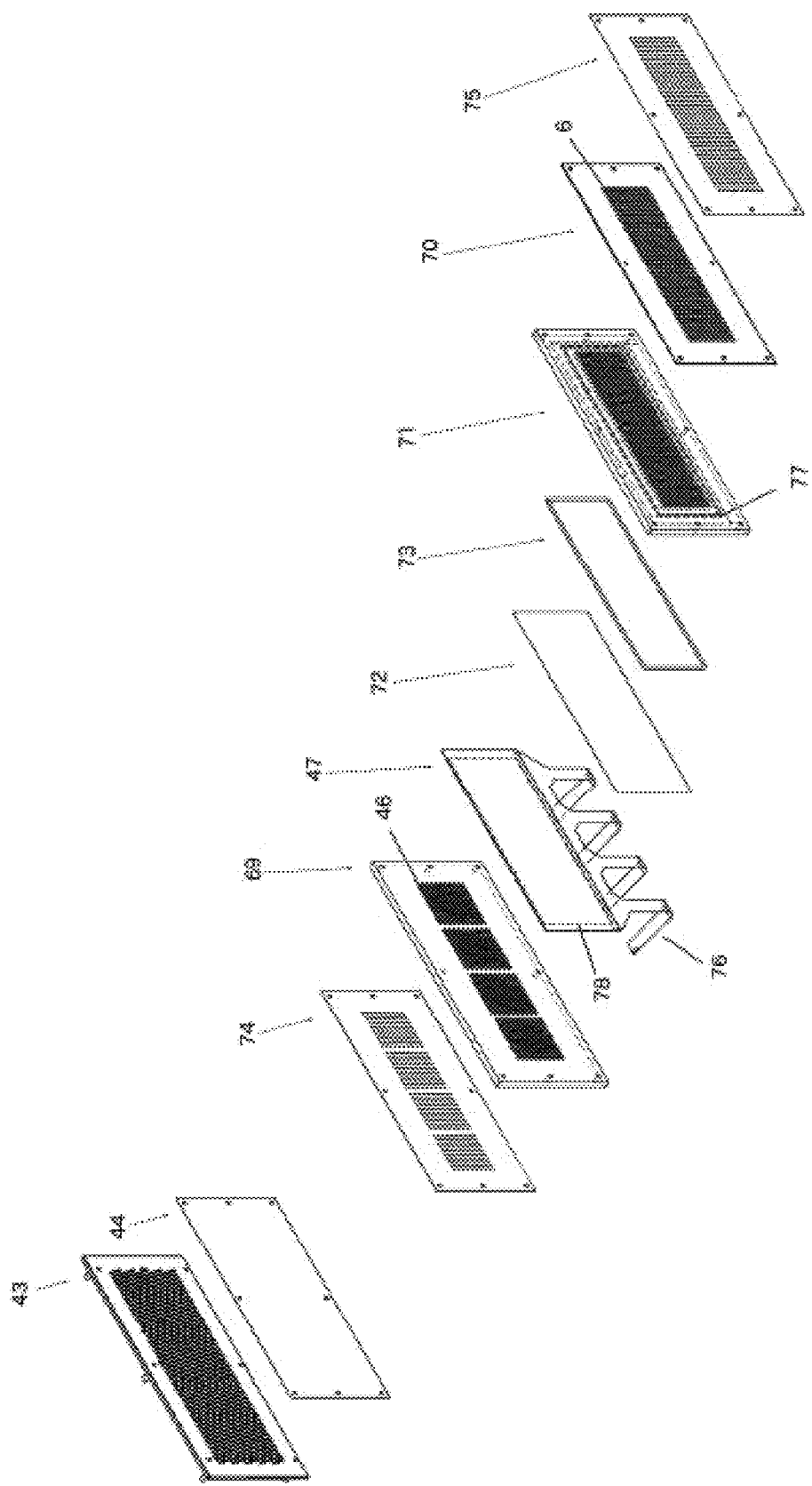

FIG. 28 shows an exploded view of central elements of the configuration in FIG. 27.

The elements are shown separated ("exploded view") for clarity but may in operation be assembled mechanically together using holes located around edges of the elements and screws (not shown).

The thin film stack 47 may comprise a substrate (not shown) on one side which may for example be 0.7 mm thick glass and it may comprise a protective cover 78 (shown with dotted lines) on the other side.

The protective cover may for example be 1.0 mm thick glass.

The thin film stack 47 may be connected to a set of wires 76 where a wire in the set of wires 76 may connect the transparent electrode 7 to an electric circuit such as a voltage source (not shown), which may be comprised in the controller 5 for applying a voltage over the thin film stack such that a current may be injected into the thin film stack.

The voltage source may for example be selected or set to output a voltage of 6 volts. The controller 5 may be able to modulate the voltage source 14 and hence control the intensity of a pixel.

Additionally, the controller 5 may be able to modulate the voltage source 14 in synchronization with a time division multiplexing for example in a similar way to the time division multiplexing described in the description of FIG. 1A.

The display system may comprise an optical filter 72, which may be located between the thin film stack 47 and the observer 1, i.e. on the front side of the thin film stack with respect to an observer.

The optical filter 72 may block a part of or essentially all light originating from the array of light emitting or transmitting elements 43 and transmitted through the thin film stack 47. Hence, unwanted emission from the display of visible or infrared light originating from the array of light emitting or transmitting elements 43 may be reduced or eliminated.

The display system may comprise a front optical arrangement such as a microlens array 70 located at the side of the thin film stack 47 towards the observer 1 (front side of the thin film stack) and comprising a plurality of microlens such as a first microlens 6 may be comprised.

The microlens 6 may be a double sided lens, for example a convex/concave lens and may have a focal length of for example 5.5 mm. The lens pitch, i.e. the distance between lens centers in the front microlens array 70 may be for example 4 mm and the front microlens array 70 may for example comprise 38×10 microlenses essentially similar to the microlens 6.

The display system may comprise a front aperture mask 75, which may be located between the front microlens array 70 and the observer 1 (front side of the front microlens array 70).

The front aperture mask 75 may comprise an opaque mask having a first aperture opening which may be essentially centered around an optical axis of the microlens 6.

The first aperture opening may be circular and may have a diameter of for example 1.5 mm. The front aperture mask may comprise a black nickel shim. Hence, the first aperture opening may increase performance of the microlens 6.

The display system may comprise a spacer 71, which may be configured so the distance from the lens center of the microlens 6 and the thin film stack 47 is essentially equal to a focal length of the microlens 6. For example the distance may be 5 mm.

The focal plane of the microlens 6 may be located essentially at the thin film stack 47. On the opposite side of the microlens 6 relative to the thin film, the microlens 6 may focus a light pattern at the thin film stack 47 at essentially infinity (i.e. having a second focal plane at infinity in praxis greater than at least 20 cm from the microlens 6), This may be a good approximation to focusing the light pattern at an eye of the observer 1 when the observer 1 is located for example 30 cm or longer away from the microlens 6.

The spacer 71 may comprise a cavity 77 (shown with dotted lines) which may contain the thin film stack 47 and the optical filter 72. The cavity 77 may have a depth essentially equal to the thickness of the thin film stack 47 (including substrate and protective cover) plus a tolerance. The tolerance may be selected to so that a glass substrate or cover glass comprised in the thin film stack 47 does not break when the display is assembled. The tolerance may be for example 100 micrometers.

An elastic element 73 may be comprised and may be located in the cavity. The elastic element may for example be a thin string of polymer foam for example 0.5 mm thick, which may be located close to the edges of the cavity. The cavity may include a guide track for holding the elastic element 73 in place. Hence, the elastic element 73 may prevent the thin film substrate 47 from moving around in the cavity, and may hold it firmly in place without breaking the glass.

The display system may comprise an optical arrangement such as a back microlens array 69, which may be located at the side of the thin film stack 47 facing away from the observer 1 (on the other side of the thin film than where an observer is intended to be when observing light from the display system, i.e. opposite the front side of the thin film stack). Alternatively, the optical arrangement may be arranged on the front side of the thin film.

The optical arrangement may comprise a second microlens 46. The back lens array 69 may have a flat side facing towards the thin film stack 47. The second microlens 46 may be a plano convex lens, it may be an even aspheric lens and it may have a focal length of 6 mm.

The second microlens 46 may have an image plane for an object field at the array of light emitting or transmitting elements 43 essentially located at the photo sensitive/diode layer comprised in the thin film stack 47.

Hence, the second microlens 46 may essentially focus an image of the array of light emitting or transmitting elements 43 on the photodiode layer. The second microlens 46 may have a lens tilt which is different from a lens tilt for another microlens in the microlens array 69. Further, the second microlens 46 may have a prismatic characteristic which may be different from the prismatic characteristic of another lens in the microlens array 69.

The display system may comprise back aperture mask 74, which may be located between the back microlens array 69 and the array of light emitting or transmitting elements 43.

The back aperture mask 74 may comprise an opaque mask having a second aperture opening, which may be essentially centered around an optical axis of the second microlens 46. The second aperture opening may be circular and may have a diameter of for example 1.5 mm.

The back aperture 74 mask may comprise a black nickel shim. Hence the second aperture opening may increase performance of the second microlens 46.

A first segment of the optical arrangement (back microlens array 69) may have a plurality of optical elements configured for projecting a first set of essentially identical images in a first segment of the addressing light element 43 onto a first segment of the photodiode layer.

In FIG. 28 four segments of the addressing light element are shown. Each segment having 20 by 20 addressing light pixels such as 20 by 20 LEDs.

The 20 by 20 LEDs define 400 directions or angles, in which an image from the display system can be emitted, i.e. the image may only be visible from a viewpoint that is in the specific direction defined by a specific addressing light pixel. If the view point changes (if the observer moves for example), another addressing light pixel may be addressed by the controller for emitting light such that the observer may view the image from the new viewpoint.

The first segment of the optical arrangement is illustrated having 10 by 10 optical elements. The number of optical elements in a segment of the optical arrangement 69 may correspond to the number of image pixels in a segment of the thin film stack.

Each optical element or lens may be arranged (using for example a ray tracing simulation tool/software program) such that the light from an addressing light pixel, which is addressed by the controller for emitting light from the addressing light pixel, is directed to an image pixel in a segment of the thin film. Thus, the display is arranged such that there may be one image pixel for each optical element.

Having 10 by 10 optical elements means that there is 10 by 10 pixels in a segment of the thin film. In total there are in FIG. 28 four segments having 10 by 10 pixels each resulting in the display having 4 by 10 by 10 image pixels resulting in 400 image pixels.

The number of addressing pixels in a segment of the addressing light element correspond to the number of subpixels in an image pixel. Having 20 by 20 addressing pixels means that there are 20 by 20 subpixels in an image pixel.

The optical elements of a segment of the optical arrangement directs the light from a (single) addressing light pixel of a segment of the addressing light element to a subpixel of each image pixel in a segment of image pixels such that the light from each subpixel of each image pixel in the segment of image pixels is emitted in substantially the same direction such that the image pixels of a segment of the thin film is visible from a given viewpoint.

One addressing light pixel correspond to one direction to a viewpoint. Thus, when there is a single viewpoint, the addressing light pixel for emitting light from the display to that viewpoint is addressed—depending of the distance to the viewpoint, addressing light pixels next to the addressed light pixel may also be addressed such that a cluster of addressing light pixels is addressed.

When there are two viewpoints, two separate addressing light pixels may be addressed so that the display may emit light to the two viewpoints (for example in different time windows or the same or overlapping time window).

Thus, a ray from an addressing light pixel, which has been addressed by the controller, is subdivided into a number of rays corresponding to the number of image pixels in a segment of the thin film, for the above example 10 by 10 "sub" rays.

Correspondingly, the second set out of the four segments of the optical arrangement (back microlens array) 69 may be capable of projecting a second set of essentially identical images of a second segment of the addressing light element (array of light emitting or transmitting elements) 43 onto a second segment of the photo sensitive/diode layer 8, i.e. the controller addresses one of the addressing pixels in the second segment of the addressing light element for emitting light from the addressing pixel. The optical element in the second segment of the optical arrangement directs the light from the addressing pixel to the subpixels of the image pixels of the second segment of the thin film stack.

The first set of back microlenses (optical elements may be located in a first segment of the back microlens array (optical arrangement) 69 and the second set of back microlenses (optical element) may be located in a second segment of the back microlens array (optical arrangement) 69.

According to the principle shown in FIG. 18, a first set of front microlenses (front optical element) located in a first segment of the front microlens array (front optical arrangement) 70 adjacent to the first segment of the photodiode layer 8 may emit light (in front of the thin film stack) towards the observer 1 in a first projected pattern corresponding to a first illuminated pattern on the first segment of the array of light emitting or transmitting elements 43.

A second set of front microlenses located in a second segment of the front microlens array 70 adjacent to the second segment of the photodiode layer 8 may emit light towards the observer 1 in a second projected pattern corresponding to a second illuminated pattern on the second segment of the array of light emitting or transmitting elements.

Hence, by selecting said first illuminated pattern and said second illuminated pattern it is possible to select said first projected pattern emitted from the first segment of the front microlens array and by selecting said second illuminated pattern it is possible to select said second projected pattern emitted by the second segment of the front microlens array.

For example the first illuminated pattern may be selected to be a first essentially circularly symmetrical cluster of light emitting or transmitting elements in which the light emitting or transmitting elements have substantially no dark gaps between them and so essentially form a first illuminated disc on a dark background. Similarly, the second illuminated pattern may be selected to form a second illuminated disc.

Hence, a first direction and a first divergence of visible beams emitted from pixels in the first segment may be selected by selecting respectively a position and a radius for the first illuminated disc.

Similarly, a first direction and a first divergence of visible beams emitted from pixels in the second segment may be selected by selecting respectively a position and a radius for the second illuminated disc.

An optical element, such as the second microlens 46, may be designed so it can compensate for an offset location of the array (addressing light element) 43 with respect to a center location of the second microlens 46.

Alternatively, a compensating lens may be comprised in an optical path between the second microlens 46 and the array of light emitting or transmitting elements 43 which may compensate for an offset location. The compensating lens may be larger than the second microlens 46, for example it may be essentially the same size as the first segment of back microlens array 69 and it may be located in the optical path between a plurality of microlenses in the first segment of the back microlens array 69 and the array of light emitting or transmitting elements 43. The compensating lens may be a collimating lens.

An eye tracking system 79 may detect a position of the first eye and a controller 80 may receive this position from the eye tracking system 79 and calculate or select the first direction, the first divergence, the second direction and the second divergence.

The shape and size of the first segment may be selected so it can be inscribed in a circle with a diameter no larger than a minimum interocular distance. This may have the advantage that for a first eye positioned essentially anywhere within the field of view of all image pixels in the segment, a combination of beam direction and divergence can be selected so beams from all pixels in the segment will cover the first eye and not cover any point located at or more than the minimum interocular distance away from the eye, hence an observer with an interocular distance equal to or bigger than the minimum interocular distance may essentially see all image pixels in the segment as illuminated with the first eye and as dark with the other eye.

Greater divergence may be selected when the first eye is positioned close to the first segment and smaller divergence when it is positioned farther away. The minimum interocular distance may be selected to 60 mm, the selected shape of the first segment may be square and the size selected to at least 1×1 mm such as 40 mm×40 mm since this can be inscribed in a circle with a diameter smaller than 60 mm.

The size of a segment may be selected as a function of the intended viewing distance from an observer to the display or as a function of the display size.

A segment may be of a size so that it includes at least two pixels.

Alternatively the minimum interocular distance may be set to 40 mm taking into account almost all of the human population including small children. The shape and size of the second segment may be selected similarly.

In a first time interval, the first direction (and for example also the first divergence) may be selected so beams from essentially all image pixels (subpixels of the image pixels) in the first segment illuminate a first eye of the observer 1 and the second direction (and for example also the second divergence may be selected so beams from essentially all image pixels (subpixels of the image pixels) in the second segment also illuminate the first eye of the observer 1, and vice versa for the third and fourth segment In a second time interval, the first direction (and for example also the first divergence) may be selected so beams from essentially all image pixels (subpixels of the image pixels) in the first segment illuminate a second eye of the observer 1 and the second direction (and for example also the second divergence) may be selected so beams from essentially all image pixels (subpixels of the image pixels) in the second segment also illuminate the second eye of the observer 1.

The configurations described in this disclosure are examples of the invention and should not be interpreted to limit the scope of the invention. On the contrary, any combinations of the examples of configurations or modifications that could be made by a person with ordinary skills in the art of optics, thin film electronics and image processing should be interpreted to be included in the scope. As an example, configurations shown in FIGS. 16 and 25 could be combined for a configuration comprising infrared illumination of an observer and further a light guide and as another example a pixel or a plurality of pixels according to the description could be used as a directional backlight for an LCD display.

Points

Now follows a set of points, which constitute aspects of the present invention which may be considered independently patentable and as such the following sets form basis for possible future sets of claims:

1. A system for directional control of an image in a display such as a television, said system comprising:

an image pixel defining an area constituting a plurality of subpixels, each subpixel being optically addressable, each subpixel comprising:

a thin film stack of an electroluminescent layer and a photo sensitive layer, said electroluminescent layer and said photo sensitive layer constituting an optical converter such that light incident on a respective subpixel leads to generation of a current through said photo sensitive layer and through said electroluminescent layer such that said electroluminescent layer emits light from the position of said respective subpixel within said image pixel when a voltage being applied across said thin film stack, said system comprising:

an addressing light element having a plurality of addressing pixels for emitting light from a respective addressing pixel to said optical converter, each addressing pixel defining a direction from said image pixel towards a viewpoint, an optical arrangement between said addressing light element and said optical converter, said optical arrangement having an optical power, a controller for addressing a respective addressing pixel for emitting light from said respective addressing pixel, said optical arrangement adapted for directing the light from said respective addressing pixel to a respective subpixel such that said image pixel emits light visible from said viewpoint.

2. A monoscopic display for displaying a picture and for reducing power consumption while displaying said picture to an observer, said monoscopic display comprising:

a plurality of image pixels arranged in a grid, each image pixel defining an area for emitting light from a part of said area, and each image pixel comprising:

a thin film stack of an electroluminescent layer and a photo sensitive/diode layer, said electroluminescent layer and said photo sensitive/diode layer constituting an optical converter, said monoscopic display comprising:

a plurality of addressing pixels including a first addressing pixel and a second address-ing pixel for illuminating said thin film stack, a controller for addressing said first addressing pixel and said second addressing pixel for emitting light from said first addressing pixel and said second addressing pixel, said first addressing pixel defining a first direction from a respective image pixel to-wards said observer, said second addressing pixel defining a second direction from a respective image pixel, said first direction being different than said second direction, the light from said first addressing pixel having a higher intensity than the light from said second addressing pixel.

The invention claimed is:

1. A display for directional control of an image to an observer, said display comprising:

a plurality of image pixels arranged in a first segment covering an area of said display, each image pixel defining an area having a plurality of subpixels, each subpixel being optically addressable and comprising:

a thin film stack of an electroluminescent layer and a photo sensitive layer, said electroluminescent layer and said photo sensitive layer constituting an optical converter such that light incident on a respective subpixel leads to generation of a first current through said photo sensitive layer and through said electroluminescent layer such that said electroluminescent layer emits light from the position of said respective subpixel within said image pixel when a voltage being applied across said thin film stack, said display comprising:

an addressing light element having a plurality of addressing pixels for emitting light from a respective addressing pixel to said first segment and optically addressing the subpixels of said segment, said plurality of addressing pixels comprising at least a respective first addressing pixel defining a first direction from said first segment towards said viewpoint, and a respective second addressing pixel defining a second direction from said first segment towards a second viewpoint, said first direction being different from said second direction, an optical arrangement between said addressing light element and said optical converter, said optical arrangement having an optical power, a front optical arrangement, said front optical arrangement having an optical power and a first focal point substantially at said optical converter, and a second focal point between said front optical arrangement and a point in front of and infinitely far away from said front optical arrangement, a controller for addressing a respective addressing pixel for emitting light from said respective addressing pixel, said optical arrangement adapted for directing the light from said respective addressing pixel to the subpixels of said segment such that the subpixels of said first segment emits light visible from said viewpoint.

2. The display according to claim 1, said optical converter having a front side towards said observer, and a backside opposite said front side.

3. The display according to claim 1, said electroluminescent layer constituting an organic light-emitting diode or organic light emitter.

4. The display according to claim 1, said optical arrangement and said addressing light element arranged behind said optical converter relative to said viewpoint.

5. The display according to claim 1, said optical arrangement and said addressing light element arranged in front of said optical converter relative to said viewpoint.

6. The display according to claim 1, comprising a second plurality of image pixels arranged in a second segment covering an area of said display for emitting light visible from said viewpoint.

7. The display according to claim 6, said second segment arranged next to said first segment.

8. The display according to claim 6, said second segment having a view angle from said viewpoint to said second segment different than the view angle from said viewpoint to said first segment.

9. The display according to claim 6, comprising a second addressing light element having a second plurality of addressing pixels for emitting light from a respective addressing pixel to said second segment and optically addressing the subpixels of said second segment.

10. The display according to claim 1, said optical arrangement comprising a plurality of optical elements.

11. The display according to claim 1, the number of optical elements corresponding to the number of image pixels.

12. The display according to claim 11, a respective optical element adapted to compensate for an off-axis position of said optical element relative to a center axis of the addressing light element.

13. The display according to claim 11, a respective optical element having a prismatic property and/or being tilted relative to a plane of the addressing light element.

* * * * *